(12) United States Patent
Muto et al.

(10) Patent No.: US 11,805,211 B2
(45) Date of Patent: Oct. 31, 2023

(54) IMAGE FORMING SYSTEM

(71) Applicant: CANON KABUSHIKI KAISHA, Tokyo (JP)

(72) Inventors: Tsuyoshi Muto, Ibaraki (JP); Keisuke Aizono, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/972,800

(22) Filed: Oct. 25, 2022

(65) Prior Publication Data

US 2023/0171358 A1 Jun. 1, 2023

(30) Foreign Application Priority Data

Nov. 29, 2021 (JP) .................................. 2021-193527

(51) Int. Cl.
*H04N 1/00* (2006.01)
*G06F 3/12* (2006.01)

(52) U.S. Cl.
CPC ....... *H04N 1/00639* (2013.01); *G06F 3/1208* (2013.01); *G06F 3/1252* (2013.01); *G06F 3/1255* (2013.01); *H04N 1/00641* (2013.01)

(58) Field of Classification Search
CPC .................................................. H04N 1/00639
USPC ......................................................... 358/1.13
See application file for complete search history.

(56) References Cited

U.S. PATENT DOCUMENTS

2017/0064117 A1* 3/2017 Tsujita .................. G06F 3/1258

FOREIGN PATENT DOCUMENTS

JP 2008302518 A 12/2008

* cited by examiner

*Primary Examiner* — Jacky X Zheng
(74) *Attorney, Agent, or Firm* — ROSSI, KIMMS & McDOWELL LLP

(57) ABSTRACT

An image forming system includes an image forming unit, a sheet folding unit, a sheet discharge tray, and a control unit. For the print job in which a first sheet bundle and a second sheet bundle are discharged onto the sheet discharge tray, the control unit is configured to selectively execute a first image forming mode or a second image forming mode. The first image forming mode is a mode in which a page order is controlled in such a manner that page numbers of sheets included in the second sheet bundle are larger than page numbers of sheets included in the first sheet bundle. The second image forming mode is a mode in which a page order is controlled in such a manner that page numbers of sheets included in the first sheet bundle are larger than page numbers of sheets included in the second sheet bundle.

12 Claims, 10 Drawing Sheets

IN CASE WHERE PRINT SIDE IS OUTWARD SIDE AND COVER SIDE IS LEFT SIDE

IN CASE WHERE PRINT SIDE IS OUTWARD SIDE AND COVER SIDE IS RIGHT SIDE

IN CASE WHERE PRINT SIDE IS INWARD SIDE AND COVER SIDE IS LEFT SIDE

IN CASE WHERE PRINT SIDE IS INWARD SIDE AND COVER SIDE IS RIGHT SIDE

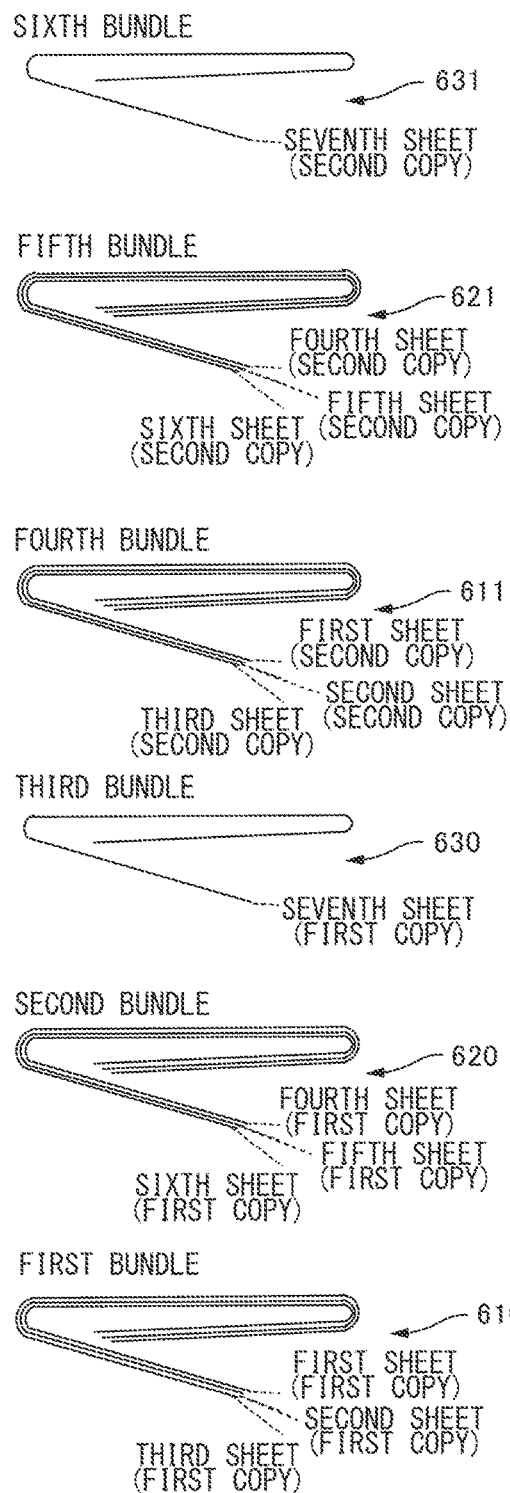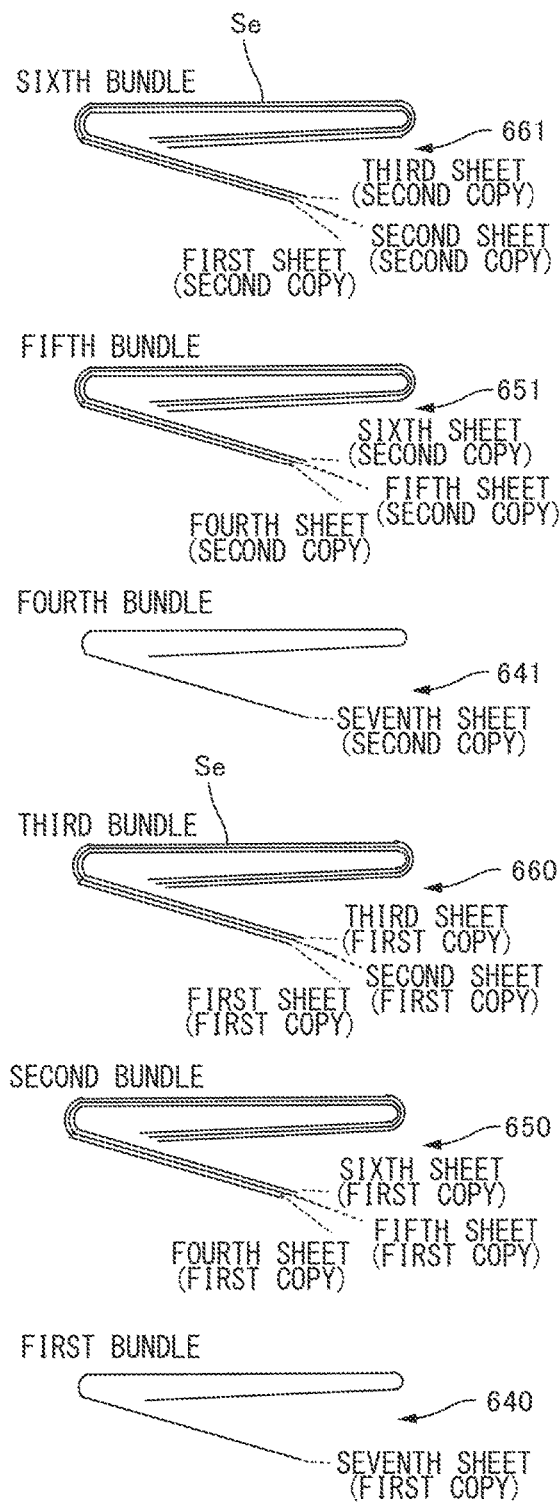

IMAGE FORMING SYSTEM

BACKGROUND OF THE INVENTION

Field of the Invention

The present disclosure relates to an image forming system for folding a sheet on which an image is formed.

Description of the Related Art

In many cases, a finishing device is connected to a multifunction machine. As a finishing device, there has been known a device that receives a sheet and performs inward tri-folding in which one end portion and the other end portion of the sheet are folded inwardly toward the same side of the sheet. In addition, as a finishing device, there is a device that collectively folds a plurality of sheets inwardly in three. Also, there is disclosed a configuration capable of checking what portion of print data appears on a front surface of a sheet bundle bundled by inward tri-folding through a preview (see JP 2008-302518 A).

However, in a case where a plurality of sheet bundles are discharged in an order contrary to the user's intention, it is necessary to change the order from image data. Thus, there has been a problem that usability deteriorates.

SUMMARY OF THE INVENTION

The present disclosure provides an image forming system capable of suppressing deterioration in usability.

According to a first aspect of the present invention, an image forming system includes an image forming unit configured to form images on a plurality of sheets, a sheet folding unit configured to fold the plurality of sheets, on which the images are formed by the image forming unit, to form a plurality of sheet bundle, a sheet discharge tray to which the sheets folded by the sheet folding unit are discharged, and a control unit configured to receive a print job and control the image forming unit based on the print job, the print job including information on the number of pages of the sheets on which the images are formed and information on the number of sheets folded by the sheet folding unit in the sheet bundle. For the print job in which the plurality of sheet bundles including a first sheet bundle and a second sheet bundle discharged after the first sheet bundle are discharged onto the sheet discharge tray, the control unit is configured to selectively execute a first image forming mode and a second image forming mode. The first image forming mode is a mode in which a page order in which the images are formed on the sheets by the image forming unit is controlled in such a manner that page numbers of sheets included in the second sheet bundle are larger than page numbers of sheets included in the first sheet bundle. The second image forming mode is a mode in which a page order in which the images are formed on the sheets by the image forming unit is controlled in such a manner that page numbers of sheets included in the first sheet bundle are larger than page numbers of sheets included in the second sheet bundle.

According to a second aspect of the present invention, an image forming system includes an image forming unit configured to form images on a plurality of sheets, a sheet folding unit configured to fold the plurality of sheets, on which the images are formed by the image forming unit, to form a plurality of sheet bundles, a sheet discharge tray to which the sheets folded by the sheet folding unit are discharged, and a control unit configured to receive a print job and control the image forming unit based on the print job, the print job including information on the number of pages of the sheets on which the images are formed and information on the number of sheets folded by the sheet folding unit in each of the sheet bundles. For the print job in which the plurality of sheet bundles including a first sheet bundle and a second sheet bundle discharged after the first sheet bundle are discharged onto the sheet discharge tray, the control unit is configured to selectively execute a first mode and a second mode. The first mode being a mode in which a page order in which the images are formed on the sheets by the image forming unit is controlled in such a manner that page numbers of sheets included in the second sheet bundle are larger than page numbers of sheets included in the first sheet bundle, and the plurality of sheets constituting each of the sheet bundles are arranged in an order in which page numbers of the sheets ascend from an innermost sheet to an outermost sheet. The second mode being a mode in which a page order in which the images are formed on the sheets by the image forming unit is controlled in such a manner that page numbers of sheets included in the first sheet bundle are larger than page numbers of sheets included in the second sheet bundle, and the plurality of sheets constituting each of the sheet bundles are arranged in an order in which page numbers of the sheets ascend from an outermost sheet to an innermost sheet.

Further features of the present invention will become apparent from the following description of exemplary embodiments with reference to the attached drawings.

BRIEF DESCRIPTION OF THE DRAWINGS

FIG. 8A is a diagram illustrating sheet bundles discharged in a forward order with sheets in each bundle being arranged in a forward order in the image forming system according to the first embodiment.

FIG. 8B is a diagram illustrating sheet bundles discharged in a reverse order with sheets in each bundle being arranged in a reverse order.

DESCRIPTION OF THE EMBODIMENTS

First Embodiment

Figure 1:
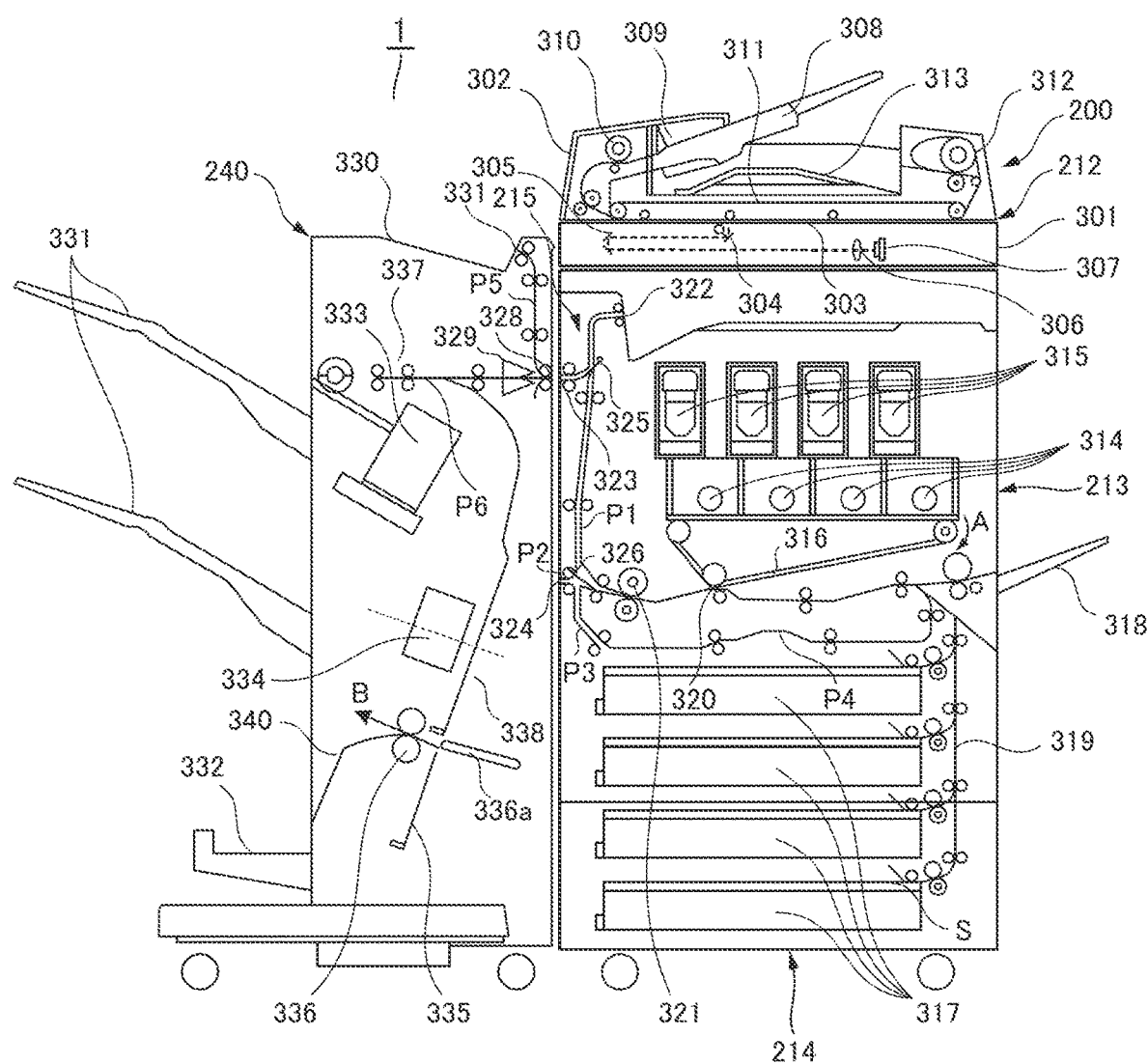
FIG. 1 is a schematic diagram of an image forming system according to a first embodiment.

Hereinafter, an embodiment according to the present disclosure will be described in detail with reference to FIGS. 1 to 8B. First, a schematic configuration of an image forming system according to a first embodiment will be described with reference to FIG. 1. FIG. 1 is a cross-sectional view illustrating an image forming apparatus 200 and a finisher 240 serving as a sheet folding unit, which constitute the image forming system 1 according to the first embodiment.

Image Forming System

As illustrated in FIG. 1, the image forming apparatus 200 includes a printer unit 213 serving as an image forming unit that forms an image on a sheet S, and a scanner unit 212 serving as an image reading unit that reads an image from a document.

The scanner unit 212 includes a scanner 301 that optically reads an image from a document, and a document feeder (DF) 302 that conveys a document to the scanner 301. In the scanner unit 212, in a case where a document is set on a document table 303 to read an image, the document is placed on the document table 303 by opening the DF 302, and then the image is read from the document by closing the DF 302. In addition, in the scanner unit 212, in a case where a document is set on the DF 302 to read an image, the document is placed on a document setting unit 308 of the DF 302. In a state where a document is placed on the document setting unit 308 and the document presence/absence sensor 309 detects the document, when the scanner unit 212 start reading an image, a sheet feeding roller 310 and a conveyor belt 311 starts rotating to convey the document is conveyed to a predetermined position on the document table 303.

When the scanner 301 reads an image from a document, the document is irradiated with light from a light source 304, such that the image is read by a CCD 307 via a reflector 305 and a lens 306. The CCD 307 converts the read image into a digital signal, and converts the digital signal into image data by performing desired image processing. The converted image data is stored in a storage unit 223 (see FIG. 2) of the image forming apparatus 200. In a case where an image is read from a document placed on the document setting unit 308 of the DF 302, after the reading of the image is completed, the conveyor belt 311 rotates to convey the document, and the document is discharged onto a sheet discharge tray 313 via a conveying roller 312 on a sheet discharge side. Note that, in the scanner unit 212, in a case where a plurality of documents are placed on the document setting unit 308, at the time when a document is conveyed out of the document table 303 for discharge, a next document is fed via the sheet feeding roller 310, such that the next document is read consecutively.

The printer unit 213 is used when the image data stored in the storage unit 223 (see FIG. 2) is printed on the sheet S. The image data is emitted to photosensitive members 314 for yellow, magenta, cyan, and black, respectively, as recording laser beams of the four colors to form electrostatic latent images on the photosensitive members 314. The printer unit 213 performs toner development with toners supplied from toner cartridges 315 for the respective colors, and primarily transfers toner images for the respective colors onto an intermediate transfer belt 316 in an overlapping manner.

The intermediate transfer belt 316 rotates in a direction indicated by an arrow A in FIG. 1 (a clockwise rotation direction). In the printer unit 213, the sheet S is fed from a sheet feeding unit 214 of a sheet cassette 317 or a manual feed tray 318 to a secondary transfer unit 320 after passing through a sheet feeding conveyance path 319. Then, multiple toner images on the intermediate transfer belt 316 are transferred onto a first side Sa (see FIGS. 5A to 5D) of the sheet S due to the action of a secondary transfer bias voltage applied to the secondary transfer unit 320.

The sheet S to which the images have been transferred is heat-pressurized by a fixing device 321 to fix the toner images thereonto, and is conveyed to a sheet discharge unit 215. In the case of single-sided printing, the sheet S conveyed to the sheet discharge unit 215 is discharged to any one of sheet discharge ports 322, 323, and 324. On the other hand, in the case of double-sided printing, the sheet S conveyed to the sheet discharge unit 215 is transferred to a conveyance path P3 by a flapper 326, and the switched-back sheet S is conveyed back to the secondary transfer unit 320 via a conveyance path P4 for double-sided printing. Then, images are formed on a second side Sb (see FIGS. 5A to 5D), which is a back side of the first side Sa of the sheet S, substantially similarly to the toner images transferred and fixed onto the first side Sa of the sheet S.

When the sheet S is discharged from the sheet discharge port 322 or the sheet discharge port 323, the sheet S is conveyed after being transferred to a conveyance path P1 by the flapper 326. In addition, when the sheet S is discharged from the sheet discharge port 324, the sheet S is conveyed after being transferred to a conveyance path P2 by the flapper 326.

When the sheet S is discharged from the sheet discharge port 322, the sheet S is discharged to a center tray 322a provided on an upper side of the printer unit 213. When the sheet S is discharged from the sheet discharge port 323, the sheet S is discharged to the finisher 240 connected to the printer unit 213. In the printer unit 213, when the sheet S is discharged from the sheet discharge port 323, the sheet S is discharged in a switched-back state from the sheet discharge port 323 after the sheet S is conveyed to the vicinity of the sheet discharge port 322 and the conveyance path is changed by a flapper 325. When the sheet S is discharged from the sheet discharge port 324, the sheet S is discharged onto a side tray 324a provided on a lateral side of the printer unit 213. Note that the printer unit 213 is configured to be able to discharge the sheet S from the sheet discharge port 324 only when the finisher 240 is not mounted.

The finisher 240 is used to perform post-processing on a printed sheet according to a function designated by a user, and the sheet S conveyed from the sheet discharge port 323 is fed from a sheet feeding port 328. In the finisher 240, a stapling process using a stapler 333, a shifting process for shifting the sheet S from the center of the conveyance path, and a folding process for folding a plurality of sheets S in a bundling manner are executed as the post-processing. The finisher 240 is also configured to be able to fold one sheet S.

When the post-processing is not performed, the sheet S fed from the sheet feeding port 328 is conveyed to a conveyance path P5 by a flapper 329 and discharged from a sheet discharge port 331 to a sheet discharge tray 330. On the other hand, when the post-processing is executed, the sheet S fed from the sheet feeding port 328 is conveyed to a conveyance path P6 by the flapper 329.

A case where the finisher 240 executes inward tri-folding as a folding process will be described. The sheet S conveyed from the sheet feeding port 328 to the conveyance path P6 is conveyed to a conveyance path 337, and then switched back and conveyed to a sheet stacking unit 335. Sheets S are stacked as many as the number of sheets to be bundled by inward tri-folding. In the first embodiment, the finisher 240 can fold at least one sheet inwardly in three, and can bundle up to five sheets by the inward tri-folding in a state where the sheets are stacked on the sheet stacking unit 335.

The sheets S stacked on the sheet stacking unit 335 are pushed out in a direction indicated by an arrow B in FIG. 1 by a folding blade 336a, thereby executing first folding in which one end portions of the sheets are folded when passing between nip portions of a pair of folding rollers 336. After the first folding is completed, the sheets S are returned to the sheet stacking unit 335. Then, after the sheets S are returned to a folding position 338, the sheets S are pushed out in the direction indicated by the arrow B in FIG. 1 by the folding blade 336a, thereby executing second folding in which the other end portions of the sheets are folded when passing between the nip portions of the pair of folding rollers 336. The sheet bundle subjected to the second folding to complete the inward tri-folding passes through a conveyance path 340, and is discharged to a sheet discharge tray 332 in an inward tri-folding shape and in a direction in which the end portions of the sheets face the sheet discharge tray 332.

Hardware Configuration

Figure 2:
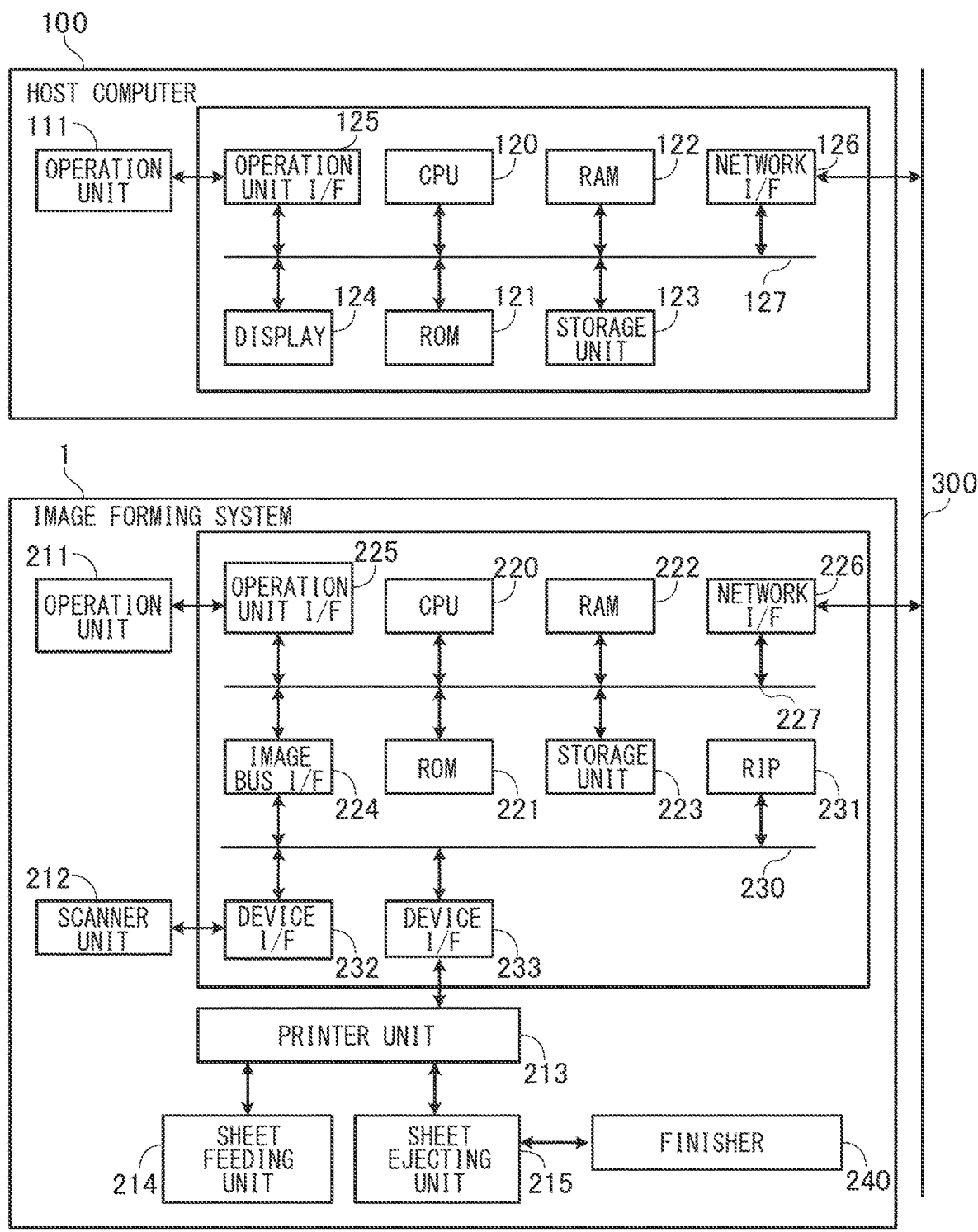
FIG. 2 is a block diagram illustrating hardware configurations of a host computer and the image forming system according to the first embodiment.

An example of a hardware configuration of the image forming system 1 and an example of a hardware configuration of a host computer 100 according to the first embodiment will be described with reference to FIG. 2.

The image forming system 1 includes a printer unit 213 that is an image output device. In addition, the image forming apparatus 200 receives a job from the host computer 100 via a local area network (LAN) 300.

A central processing unit (CPU) 220 is a central processing unit for controlling each of the units of the image forming system 1 in a comprehensive manner. A random access memory (RAM) 222 is a system work memory for the CPU 220 to operate. The RAM 222 is also a memory for temporarily storing a received job, intermediate data generated for image forming processing, a work area at the time of performing rendering processing, and input image data. A read only memory (ROM) 221 is, for example, a boot ROM, and stores a system boot program. A storage unit 223 is, for example, a hard disk drive (HDD), and stores system software for various processes and received jobs.

An operation unit I/F 225 is an interface unit for an operation unit 211 having a display unit for displaying various menus, job information, and the like, and outputs operation screen data to the operation unit 211. In addition, the operation unit I/F 225 transmits information input by a user via the operation unit 211 to the CPU 220.

A network I/F 226 is an interface for exchanging information with an external device (the host computer 100) via the LAN 300.

The CPU 220, the ROM 221, the RAM 222, the storage unit 223, the operation unit OF 225, and the network I/F 226 are connected to a system bus 227.

An image bus I/F 224 is an interface for connecting the system bus 227 to an image bus 230 that transfers image data at a high speed, and is a bus bridge that converts a data structure. A raster image processor (RIP) 231 and device I/Fs 232 and 233 are connected to the image bus 230.

The RIP 231 analyzes intermediate data (display list) generated by the processing of the CPU 220 from a job on the basis of an instruction from the CPU 220, and develops the intermediate data into an image in a raster format. The developed image is transmitted to the printer unit 213 through the system bus 227 and the device I/F 233, or transmitted to the RAM 222 and the storage unit 223 through the image bus I/F 224. The RIP 231 may be implemented by any of hardware and software operating therein or in a general-purpose CPU.

The device I/F 232 is an interface for receiving data from the scanner unit 212. The scanner unit 212 is connected to the device I/F 232, and generates an image in a raster format from a read sheet. The generated image is transmitted to the printer unit 213 through the system bus 227 and the device I/F 233, or transmitted to the RAM 222 and the storage unit 223 through the image bus I/F 224.

The device I/F 233 is an interface for transmitting data to the printer unit 213. The printer unit 213 is connected to the device I/F 233, and outputs an image generated in response to an instruction of the CPU 220 to a sheet S (paper) fed from the sheet feeding unit 214, and the sheet S is discharged to the sheet discharge unit 215.

The finisher 240 is connected to the sheet discharge unit 215, and performs the above-described post-processing such as inward tri-folding, sorting, and stapling on the sheets output from the printer unit 213 to the sheet discharge unit 215.

A CPU 120 of the host computer 100 is a central processing unit for controlling (each unit of) the host computer in a comprehensive manner. The CPU 120 executes a program stored in a storage unit 123. Examples of the program executed by the CPU 120 include an application program, a utility program, a printer driver program, an operating system (OS), and a network printer control program. In addition, when executing the program, the CPU 120 performs control to temporarily store information, files, and the like necessary for executing the program in a RAM 122.

A ROM 121 is a storage medium that stores programs such as a basic I/O program, and various types of data such as font data and template data used during document processing. The RAM 122 is a storage medium that temporarily stores data, and functions as a main memory or a work area of the CPU 120. The storage unit 123 is one of external storage devices, and functions as a large-capacity memory. The storage unit 123 stores an application program, a utility program, a printer driver program, an OS, a network printer control program, and related programs, as described above.

An operation unit I/F 125 is a user interface for a user to input an instruction. The operation unit I/F 125 includes, for example, a keyboard and a mouse, such that the user gives an input instruction to the host computer 100 using them.

A display 124 displays various programs executed on the host computer 100. A system bus 127 is a data transmission path in the host computer 100. A network I/F 126 is an interface for exchanging information with the image forming apparatus 200 via the LAN 300.

Figure 3:
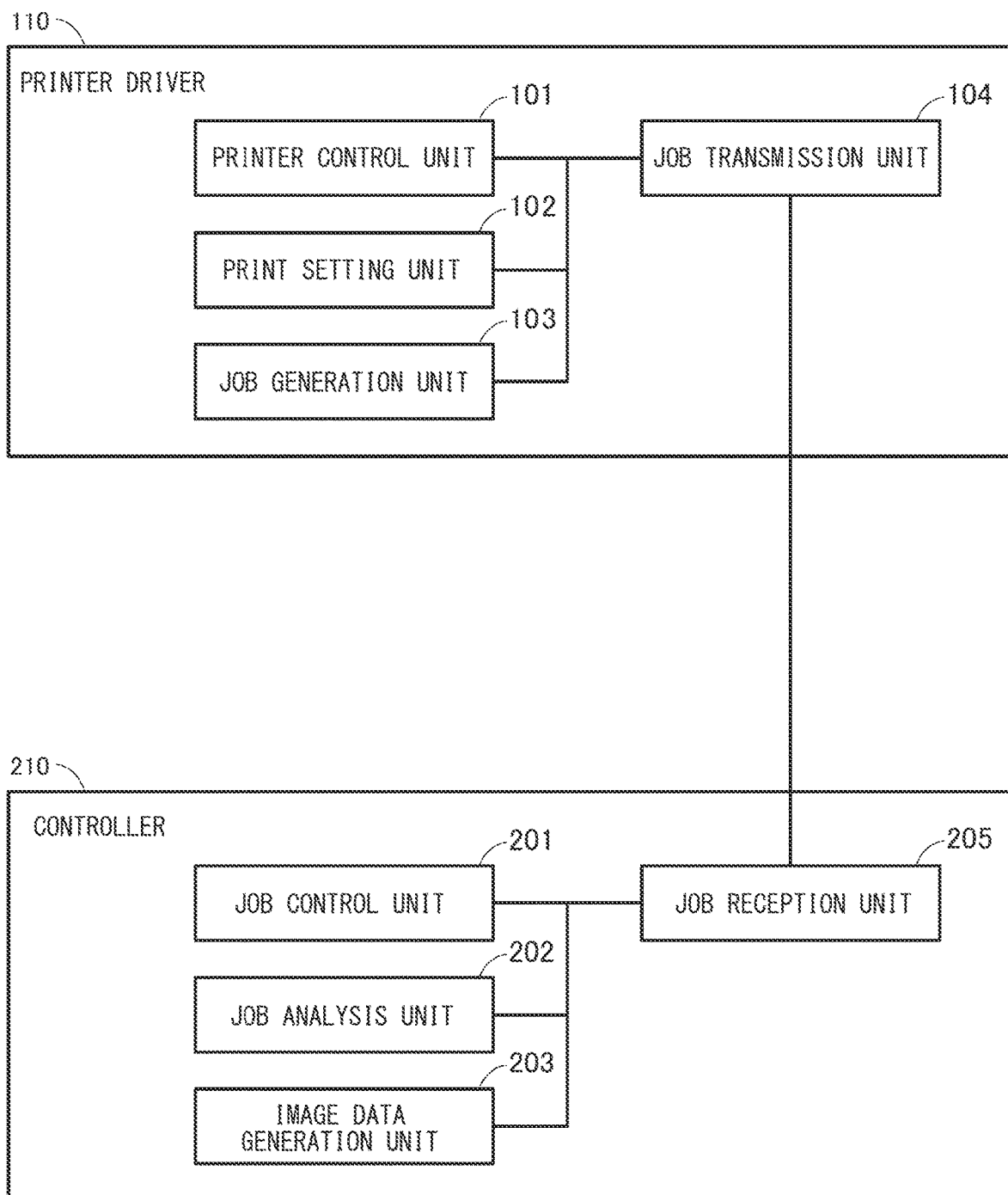
FIG. 3 is a block diagram illustrating software configurations of a printer driver and a controller according to the first embodiment.

A software configuration of a printer driver 110 executed by the host computer 100 according to the first embodiment will be described with reference to FIG. 3.

A printer control unit 101 of the printer driver 110 controls each software unit operating on the CPU 120 from reading print data designated by the user to transmitting the print data as a job to the image forming apparatus 200. A print setting unit 102 notifies a job generation unit 103 of print setting information such as the number of copies of printing the print data designated by the user, the number of sheets to be folded together in an overlapping manner, a folding pattern of inward tri-folding, and a sheet page order. The job generation unit 103 reads the print data designated by the user, and generates a print job to be transmitted to the image forming apparatus 200 in conjunction with the print setting information notified from the print setting unit 102. The generated print job is transmitted from a job transmission unit 104 to a job reception unit 205 constituting a controller 210 of the image forming apparatus 200.

A job control unit 201 of the controller 210 of the image forming apparatus 200 is software operating on the CPU 220 (see FIG. 2), and controls a printing-related job for printing. In addition, the job control unit 201 controls hardware and software related to execution of copying using the scanner unit 212. In other words, each software unit related to the print job illustrated in FIG. 3 is controlled by the job control unit 201 operating on the CPU 220. The CPU 220 constitutes a control unit in the first embodiment.

A job analysis unit 202 receives a print job transmitted from the host computer 100 through the LAN 300 via the network I/F 226, and analyzes the received print job. The job analysis unit 202 notifies the job control unit 201 of print setting information obtained from a job analysis result. In addition, the job analysis unit 202 acquires drawing information for printing each page of sheet from the print job, and generates intermediate data used for image forming processing.

An image data generation unit 203 generates image data in a raster format from the intermediate data generated by the job analysis unit 202. The job control unit 201 transfers the image data in the raster format generated by the image data generation unit 203 to the printer unit 213 for printing.

Print Job

Figure 4:
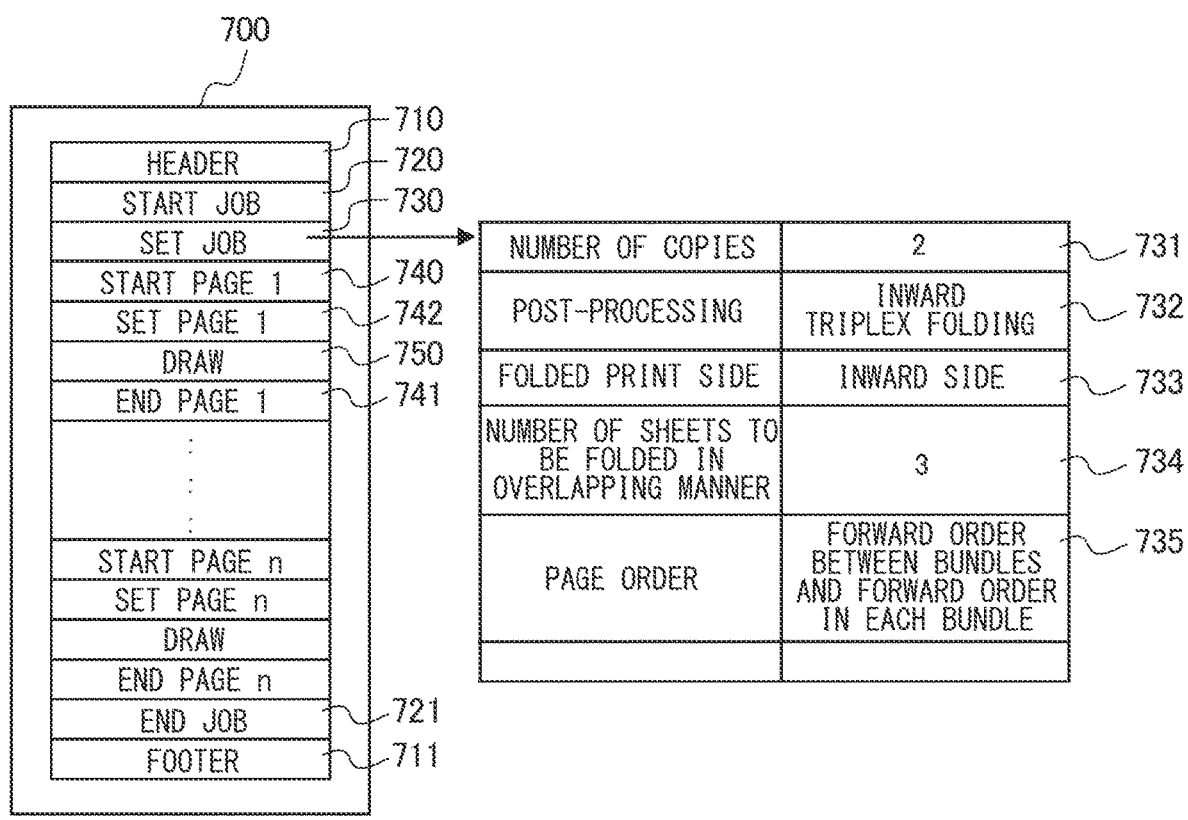
FIG. 4 is a diagram for explaining a configuration of a print job according to the first embodiment.

FIG. 4 is a diagram illustrating a configuration of a print job 700 generated by the job generation unit 103. As illustrated in FIG. 4, the print job 700 includes a specific header 710 and a specific footer 711 at a leading end and a trailing end, respectively, so that the image forming apparatus 200 can recognize and process the print job.

The print job 700 includes a job start command 720 indicating the start of the job, a job end command 721 indicating the end of the job, and a job setting command 730 for designating job information and print settings valid for each job.

The job setting command 730 includes copy number information 731, post-processing information 732, folded print side information 733, overlap-folded sheet number information 734, and page order information 735. The copy number information 731 is information indicating the number of copies of a product to be generated by printing n pages. The post-processing information 732 is information indicating details of post-processing executed by the finisher 240, and is, for example, information for designating post-processing such as inward tri-folding. The folded print side information 733 is information for designating which direction a side (print side) on which an image is formed faces between an inward direction and an outward direction, in a case where a sheet is folded by post-processing. The overlap-folded sheet number information 734 is information for designating the number of sheets (the number of sheets to be folded in an overlapping manner) to be included in each sheet bundle created by the post-processing.

The page order information 735 is information for designating a page order in each sheet bundle and an order in which sheet bundles are discharged. In a case where the post-processing is executed so that a page order in each sheet bundle is an order in which page numbers of sheets ascend from an innermost sheet to an outermost sheet, a forward order in each bundle is designated in the page order information 735. On the other hand, in a case where the post-processing is executed so that a page order in each sheet bundle is an order in which page numbers of sheets ascend from an outermost sheet to an innermost sheet, a reverse order in each bundle is designated in the page order information 735. In addition, in a case where the sheets included in the sheet bundles are discharged in the page order set in the print job 700, a first sheet discharge order that is a forward order between the bundles is designated as an order in which the sheet bundles are discharged in the page order information 735. On the other hand, in a case where the sheets included in the sheet bundles are discharged in a reverse order to the page order set in the print job 700, a second sheet discharge order that is a reverse order between the bundles is designated as an order in which the sheet bundles are discharged in the page order information 735.

The CPU 220 performs print settings designated by the information included in the job setting command 730. Note that the job setting command 730 includes information capable of designating many print settings in addition to the various types of information described above.

Further, the print job 700 includes a page start command 740 indicating the start of each page, a page end command 741 indicating the end of each page, and a page setting command 742 for designating print settings valid for each page. The print job 700 includes a drawing command 750 for drawing a character, an image, and a figure. In the print job 700, the page start command 740, the page end command 741, the page setting command 742, and the drawing command 750 are included as many as n pages, which is the number of sheets to be printed for each copy, that is, the number of pages for each copy.

Inward Tri-Folding

Among several kinds of post-processing performed by the finisher 240, "inward tri-folding" will be described with reference to FIGS. 5A to 5D. The inward tri-folding is a process of folding one end portion and the other end portion of a sheet in such a manner that one side of the sheet is an inward side. In FIGS. 5A to 5D, in which single-sided printing is performed by the printer unit 213, the first side Sa that is a print side on which an image is formed is indicated by dot hatching, and the second side Sb that is a back side of the first side Sa is indicated by white.

Figure 5A:
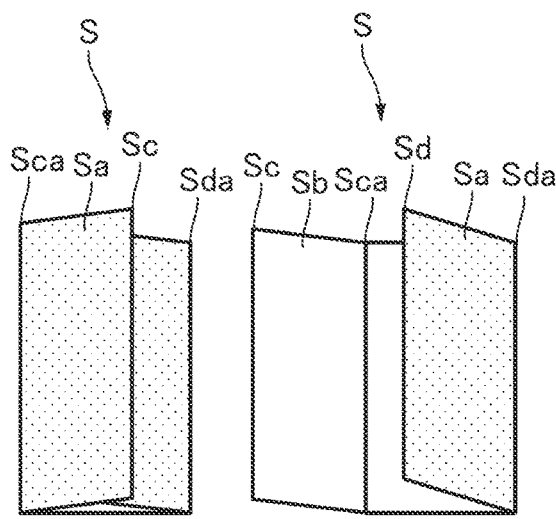
FIG. 5A is a diagram illustrating a case where a print side is an outward side of a sheet, and the sheet is folded inwardly in three in such a manner that a left end portion of the sheet in FIG. 5A is a portion that opens first in the image forming system according to the first embodiment.
Figure 5B:
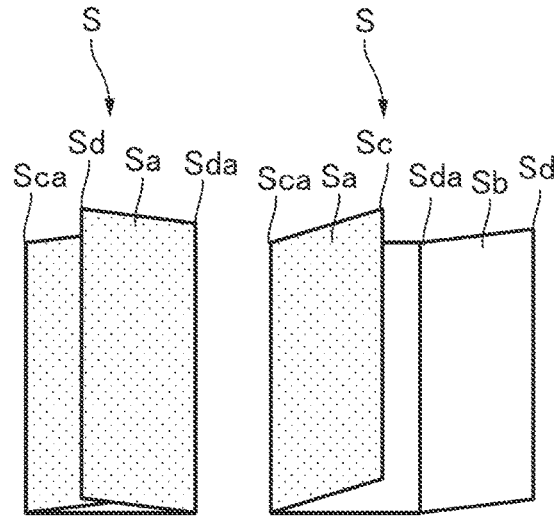
FIG. 5B is a diagram illustrating a case where a print side is an outward side of a sheet, and the sheet is folded inwardly in three in such a manner that a right end portion of the sheet in FIG. 5B is a portion that opens first.
Figure 5C:
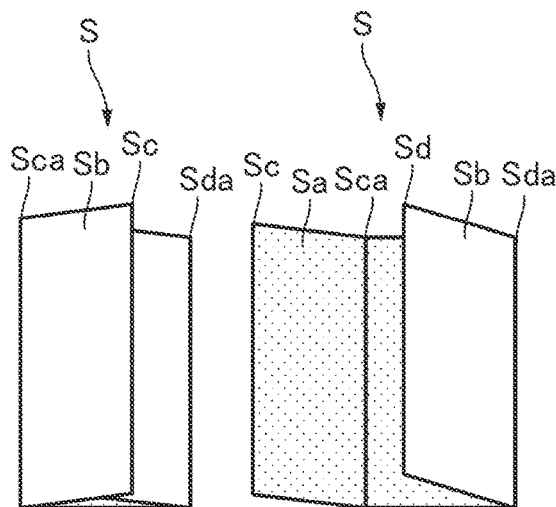
FIG. 5C is a diagram illustrating a case where a print side is an inward side of a sheet, and the sheet is folded inwardly in three in such a manner that a left end portion of the sheet in FIG. 5C is a portion that opens first.
Figure 5D:
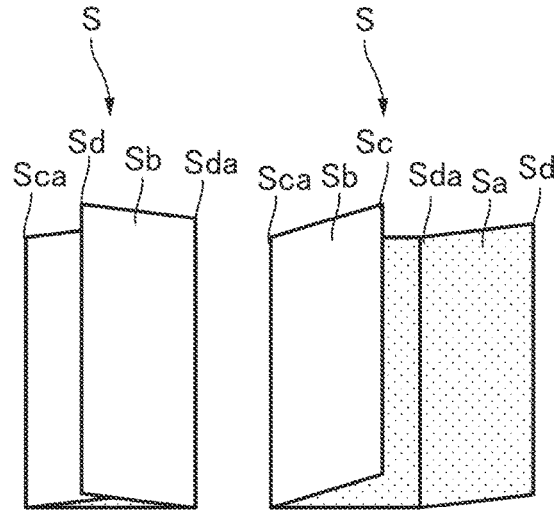
FIG. 5D is a diagram illustrating a case where a print side is an inward side of a sheet, and the sheet is folded inwardly in three in such a manner that a right end portion of the sheet in FIG. 5D is a portion that opens first.

FIG. 5A illustrates a case where the first side Sa as a print side is visible in a state where the sheet S is folded inwardly in three, that is, inward tri-folding is performed in such a manner that the print side is an outward side of the sheet S and a left end portion Sc in FIG. 5A is a cover side that opens first. FIG. 5B illustrates a case where inward tri-folding is performed in such a manner that the print side is an outward side of the sheet S and a right end portion Sd in FIG. 5B is a cover side that opens first. FIG. 5C illustrates a case where in a state where the sheet S is folded inwardly in three, a print side covered by the folded end portions is invisible, that is, inward tri-folding is performed in such a manner that the first side Sa as a print side is an inward side of the sheet S and the left end portion Sc in FIG. 5C is a cover side that opens first. FIG. 5D illustrates a case where inward tri-folding is performed in such a manner that the print side is an inward side of the sheet S and a right end portion Sd in FIG. 5D is a cover side that opens first.

As illustrated in FIGS. 5A and 5B, in a case where the print side is an outward side of the sheet S, the second side Sb is an inward side at a central portion Se sandwiched between a fold line Sca of the end portion Sc and a fold line Sda of the end portion Sd. In addition, as illustrated in FIGS. 5C and 5D, in a case where the print side is an inward side of the sheet S, the first side Sa is an inward side at a central portion Se sandwiched between a fold line Sca of the end portion Sc and a fold line Sda of the end portion Sd.

In the image forming system 1, in a case where an outward side is designated in the folded print side information 733 of the print job 700, the print side is controlled to be an outward side of the sheet S as illustrated in FIGS. 5A and 5B. Specifically, in a case where an outward side is designated in the folded print side information 733, the image forming system 1 forms an image on the first side Sa of the sheet S in the printer unit 213, and then the sheet S is transferred to the conveyance path P1 by the flapper 326. After the sheet S is conveyed to the vicinity of the sheet discharge port 322 and the conveyance path is changed by the flapper 325, the sheet S is conveyed from the sheet discharge port 323 to the sheet feeding port 328 in a switched-back state, thereby conveying the sheet S to the finisher 240 in a state where the first side Sa faces a downward direction. The finisher 240 executes inward tri-folding on the sheet S conveyed in a state where the first side Sa faces the downward direction, so that the inward tri-folding can be executed in such a manner that the first side Sa that is a print side is an outward side. In a case where the print job is single-sided printing as described above, the process of folding one end portion and the other end portion of the sheet in such a manner that the print side is an outward side is a second tri-folding process in the present embodiment.

In the image forming system 1, in a case where an inward side is designated in the folded print side information 733 of the print job 700, the print side is controlled to be an inward side of the sheet S as illustrated in FIGS. 5C and 5D. Specifically, in a case where an inward side is designated in the folded print side information 733, the image forming system 1 forms an image on the first side Sa of the sheet S in the printer unit 213, and then the sheet S is transferred to the conveyance path P3 by the flapper 326. The sheet S passes through the secondary transfer unit 320 and the fixing device 321 via the conveyance path P4 for double-sided printing, and then is conveyed to the conveyance path P1 by changing the conveyance path through the flapper 326. Then, after the sheet S is conveyed to the vicinity of the sheet discharge port 322 and the conveyance path is changed by the flapper 325, the sheet S is conveyed from the sheet discharge port 323 to the sheet feeding port 328 in a switched-back state, thereby conveying the sheet S to the finisher 240 in a state where the first side Sa faces an upward direction. The finisher 240 executes inward tri-folding on the sheet S conveyed in a state where the first side Sa faces the upward direction, so that the inward tri-folding can be executed in such a manner that the first side Sa that is a print side is an inward side. In a case where the print job is single-sided printing as described above, the process of folding one end portion and the other end portion of the sheet in such a manner that the print side is an inward side is a first tri-folding process in the present embodiment.

The image forming system 1 according to the first embodiment is configured such that a user can designate one of the four inward tri-folding patterns illustrated in FIGS. 5A to 5D as a print job through an operation unit 111 of the host computer 100. Note that the image forming system 1 may be configured to be able to designate an inward tri-folding pattern as a print job through the operation unit 211 of the image forming apparatus 200.

Print Control Process in Case where Inward Tri-Folding is Performed

Figure 6:
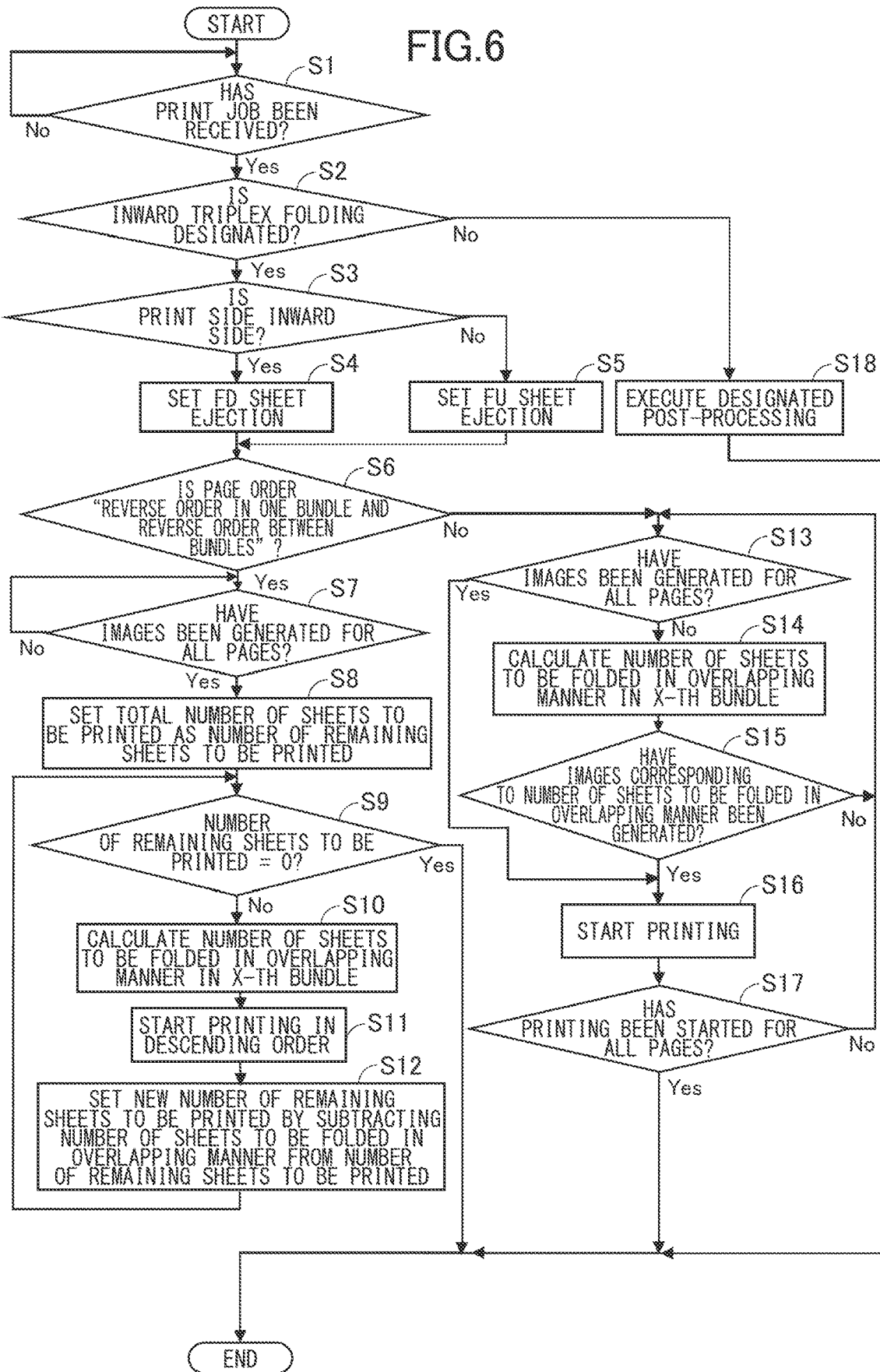
FIG. 6 is a flowchart illustrating a print control process in a case where a job control unit causes a finisher to execute inward tri-folding according to the first embodiment.

FIG. 6 is a flowchart illustrating a print control process in a case where the job control unit 201 of the controller 210 of the image forming apparatus 200 causes the finisher 240 to execute inward tri-folding according to the first embodiment.

First, the job control unit 201 determines whether or not a print job 700 has been received (S1). When it is determined that the print job 700 has not been received (No), the processing of the step S1 is repeated until a print job 700 is received. When it is determined that a print job 700 has been received (Yes), the job control unit 201 determines whether or not post-processing designated in post-processing information 732 included in the print job 700 is inward tri-folding (S2). In this processing, the job analysis unit 202 analyzes the post-processing information 732 of the print job 700, and notifies the job control unit 201 of an analysis result. When the job control unit 201 determines that inward tri-folding is designated from the notification (Yes), the process proceeds to step S3. On the other hand, when the job control unit 201 determines that post-processing other than the inward tri-folding is designated from the notification (No), the post-processing designated in the post-processing information 732 of the print job 700 is executed (S18). Then, the job control unit 201 ends the control process as the print job 700 is completed.

In the processing of the step S3, the job control unit 201 determines whether or not a print side designated in folded print side information 733 included in the print job 700 is an inward side (S3). In this processing, the job analysis unit 202 analyzes the folded print side information 733 of the print job 700, and notifies the job control unit 201 of an analysis result. When the job control unit 201 determines that an inward side is designated as the print side from the notification (Yes), face-down (FD) sheet discharge is executed (S4). In this processing, the job control unit 201 performs the FD sheet discharge in which the print side faces the sheet discharge tray 332, by discharging the sheet so that the first side Sa faces the sheet discharge tray 332 at the central portion Se sandwiched between the fold line Sca of the end portion Sc and the fold line Sda of the end portion Sd.

On the other hand, in the processing of the step S3, when the job control unit 201 determines that an outward side is designated as the print side from the notification (No), face-up (FU) sheet discharge is executed (S5). In this processing, the job control unit 201 performs the FU sheet discharge in which a back side of the print side faces the sheet discharge tray 332, by discharging the sheet so that the second side Sb faces the sheet discharge tray 332 at the central portion Se sandwiched between the fold line Sca of the end portion Sc and the fold line Sda of the end portion Sd.

After the processing of the step S4 or S5 is executed, the job control unit 201 determines whether or not the page order in each sheet bundle designated in page order information 735 included in the print job 700 is a reverse order in each bundle and whether or not the order in which sheet bundles discharged is a reverse order between the bundles (S6). In this processing, the job analysis unit 202 analyzes the page order information 735 of the print job 700, and notifies the job control unit 201 of an analysis result. When it is determined that a reverse order in each bundle and a reverse order between the bundles are designated from the notification (Yes), the job control unit 201 determines whether or not image data has been generated for all the pages designated in the print job 700 (S7). In this processing, when it is determined that images have not been generated for all the pages (No), the job control unit 201 repeats the processing of the step S7 until images are generated for all the pages.

On the other hand, when it is determined that images have been generated for all the pages (Yes), the job control unit 201 calculates a total number of sheets to be printed from the number of generated images and the settings of the print job 700, and stores the total number of sheets to be printed in the RAM 122 as the number of remaining sheets to be printed (S8).

Next, the job control unit 201 determines whether or not the number of remaining sheets to be printed is 0 (S9). In this processing, when it is determined that the number of remaining sheets to be printed stored in the RAM 122 is 0 (Yes), the job control unit 201 determines that the received print job 700 has been completed, and ends the print control process for executing the inward tri-folding.

On the other hand, when it is determined that the number of remaining sheets to be printed is not 0 (No), the job control unit 201 calculates the number of sheets to be folded in an overlapping manner in an x-th bundle (S10). Here, the variable x is a variable indicating a current bundle number.

In the processing of the step S10, the job control unit 201 calculates the number of sheets S to be included in a sheet bundle (the number of sheets to be folded in an overlapping manner) for inward tri-folding to be performed by the finisher 240 from now on. In addition, in a case where a reverse order in each bundle and a reverse order between the bundles are set, when the number of sheets for each copy exceeds the number of sheets designated in the overlap-folded sheet number information 734 (the designated number of sheets), and a bundle of sheets are further generated in a number less than the designated number of sheets, the job control unit 201 calculates the number of sheets to be folded in an overlapping manner so that the fractional bundle is a first bundle. The step S10 will be described in detail below.

Next, the job control unit 201 starts printing the images in the page order designated in the print job 700 in descending order (S11). In this processing, the job control unit 201 starts printing in descending order by sequentially transferring image data corresponding to the number of sheets to be folded in an overlapping manner calculated in the processing of the step S10 to the printer unit 213 from image data for a last one of pages that have not been transmitted. Furthermore, in the processing of the step S11, the job control unit 201 also transfers settings for inward tri-folding and settings for sheet discharge set in the processing of the step S4 or S5 to the printer unit 213.

Next, the job control unit 201 sets a number obtained by subtracting the number of sheets to be folded in an overlapping manner calculated in the processing of the step S10 from the number of remaining sheets to be printed as a new number of remaining sheets to be printed (S12), and returns to the processing of the step S9. The job control unit 201 repeats the processing of the steps S9 to S12 until the number of remaining sheets to be printed becomes 0, thereby completing the printing of the images and the inward tri-folding as many as the number of sheets instructed in the print job 700.

The processing of the steps S7 to S12 for causing the printer unit 213 to form images so that the sheet bundles are discharged onto the sheet discharge tray 332 in a reverse order constitutes a second image forming mode in the first embodiment. In addition, the control for causing the finisher 240 to fold a plurality of sheets in a bundling manner in such a manner that the plurality of sheets constituting each sheet bundle are arranged in a reverse order, which is an order in which page numbers of the sheets ascend from the outermost sheet to the innermost sheet, by executing the processing of the steps S7 to S12 constitutes a second folding mode in the first embodiment. Further, the processing of the steps S7 to S12, in which the plurality of sheet bundles are output by the image forming system 1 in a reverse order with the sheets in each bundle being also output in a reverse order, constitutes a second mode in the first embodiment.

In the processing of the step S6, when it is determined that a forward order in each bundle and a forward order between the bundles are designated from the notification (No), the job control unit 201 determines whether or not image data has been generated for all the pages designated in the print job 700 (S13). In this processing, when it is determined that images have not been generated for all the pages (No), the job control unit 201 calculates the number of sheets to be folded in an overlapping manner in an x-th bundle (S14).

In the processing of the step S14, the job control unit 201 calculates the number of sheets S to be folded in an overlapping manner to be included in a sheet bundle for inward tri-folding to be performed by the finisher 240 from now on. In addition, in a case where a forward order between bundles with a forward order in each bundle is set, when the number of sheets for each copy exceeds the designated number of sheets, and a bundle of sheets are further generated in a number less than the designated number of sheets, the job control unit 201 calculates the number of sheets to be folded in an overlapping manner so that the fractional bundle is a last bundle. The step S14 will be described in detail below.

Next, the job control unit 201 determines whether or not image data corresponding to the number of sheets to be folded in an overlapping manner calculated in the processing of the step S14 has been generated (S15). In this processing, when it is determined that image data corresponding to the number of sheets to be folded in an overlapping manner has not been generated (No), the job control unit 201 returns to the processing of the step S13.

On the other hand, when it is determined that image data corresponding to the number of sheets to be folded in an overlapping manner has been generated (Yes), or when it is determined in the processing of the step S13 that images have been generated for all the pages (Yes), the job control unit 201 proceeds to the processing of step S16. In the processing of the step S16, the job control unit 201 starts printing the images in the page order designated in the print job 700 in ascending order (S16). In this processing, the job control unit 201 starts printing in ascending order by sequentially transferring image data corresponding to the number of sheets to be folded in an overlapping manner calculated in the processing of the step S14 to the printer unit 213 from image data for a first one of pages that have not been transmitted. Furthermore, in the processing of the step S16, the job control unit 201 also transfers settings for inward tri-folding and settings for sheet discharge set in the processing of the step S4 or S5 to the printer unit 213.

Next, the job control unit 201 determines whether or not the image data for all the pages designated in the print job 700 has been transferred to the printer unit 213, and the printing of the images has been started for all the pages (S17). In this processing, when it is determined that the image data for all the pages designated in the print job 700 has been transferred to the printer unit 213 (Yes), the job control unit 201 determines that the received print job 700 has been completed. Then, the job control unit 201 ends the print control process for executing the inward tri-folding. On the other hand, when it is determined that some of the image data for all the pages designated in the print job 700 has not been transferred to the printer unit 213 (No), the job control unit 201 determines that the received print job 700 has not been completed, and returns to the processing to the step S13.

The processing of the steps S13 to S17 for causing the printer unit 213 to form images so that the sheet bundles are discharged onto the sheet discharge tray 332 in a forward order constitutes a first image forming mode in the first embodiment. In addition, the control for causing the finisher 240 to fold a plurality of sheets in a bundling manner in such a manner that the plurality of sheets constituting each sheet bundle are arranged in a forward order, which is an order in which page numbers of the sheets ascend from the innermost sheet to the outermost sheet, by executing the processing of the steps S13 to S17 constitutes a first folding mode in the first embodiment. Further, the processing of the steps S13 to S17, in which the plurality of sheet bundles are output by the image forming system 1 in a forward order with the sheets in each bundle being also output in a forward order, constitutes a first mode in the first embodiment.

Process of Calculating Number of Sheets to be Folded in Overlapping Manner

Figure 7:
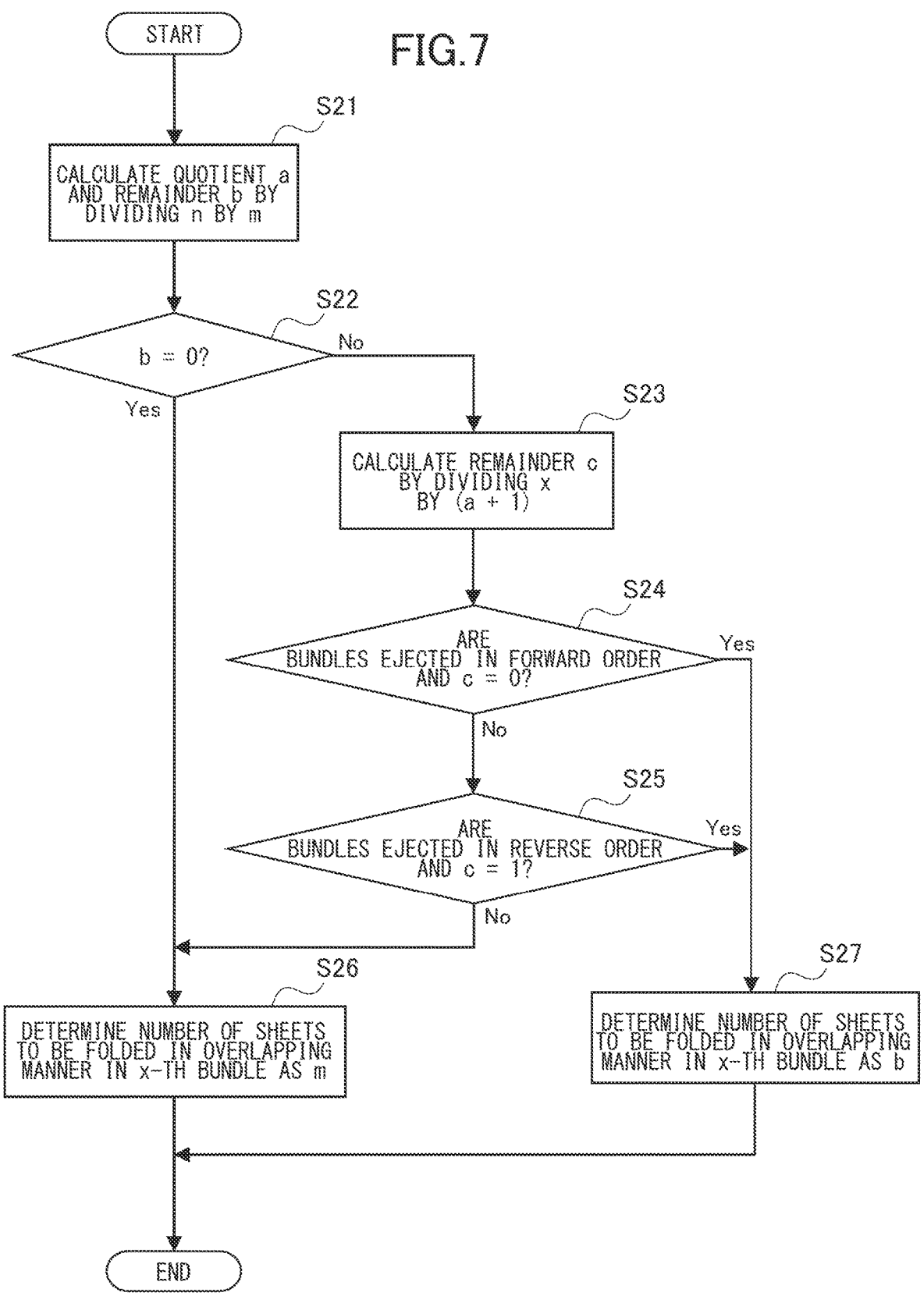
FIG. 7 is a flowchart illustrating a process of calculating the number of sheets to be folded in an overlapping manner in an x-th bundle executed in the print control process according to the first embodiment.

FIG. 7 is a flowchart illustrating a process of calculating the number of sheets to be folded in an overlapping manner in an x-th bundle executed in the processing of the step S10 or S14 in the print control process for executing the inward tri-folding illustrated in FIG. 6.

As illustrated in FIG. 7, the job control unit 201 first calculates a quotient a and a remainder b by dividing n by m, the variable n being the number of pages for each copy and the variable m being the designated number of sheets designated in the overlap-folded sheet number information 734 of the print job 700 (S21). For example, in a case where 7 pages are designated as the number of pages for each copy and 3 sheets are designated as the designated number of sheets designated in the overlap-folded sheet number information 734, the job control unit 201 sets the variables as n=7 and m=3. Then, the job control unit 201 obtains a value "2" as the quotient a and a value "1" as the remainder b by dividing the value "7" by the value "3". Here, the value of the quotient a refers to the number of sheet bundles each including a designated number of sheets, and the value of the remainder b refers to the number of sheets as a fraction less than the designated number of sheets.

Next, the job control unit 201 determines whether or not the value of the remainder b is "0" (S22). In this processing, when it is determined that the value of the remainder b is not "0" (No), the job control unit 201 calculates a remainder c by dividing a variable x indicating a current bundle number by a+1, which is obtained by adding a value "1" to the quotient a (S23). Here, the value "a+1" refers to the number of bundles for each copy.

Next, the job control unit 201 determines whether or not the sheet bundles are discharged in a forward order and the value of the remainder c is "0" (S24). In this processing, when it is determined that at least one of the condition for the order in which the sheet bundles are discharged and the condition for the value of the remainder c is not satisfied (No), the job control unit 201 proceeds to processing of step S25. In the processing of the step S25, the job control unit 201 determines whether or not the sheet bundles are discharged in a reverse order and the value of the remainder c is "1" (S25).

In the processing of the step S25, when it is determined that at least one of the condition for the order in which the sheet bundles are discharged and the condition for the value of the remainder c is not satisfied (No), the job control unit 201 determines that the x-th bundle is not a fractional bundle of sheets in a number less than the designated number of sheets, and proceeds to processing of step S26. In addition, when it is determined in the processing of the step S22 that the value of the remainder b is "0" (Yes), the job control unit 201 determines that a fractional bundle of sheets in a number less than the designated number of sheets is not generated, and proceeds to the processing of the step S26. In the processing of the step S26, the job control unit 201 determines the number of sheets to be folded in an overlapping manner in the x-th bundle as m, which is the same as the designated number of sheets (S26), and ends the process of calculating the number of sheets to be folded in an overlapping manner in the x-th bundle.

In the processing of the step S24, when it is determined that both of the condition for the order in which the sheet bundles are discharged and the condition for the value of the remainder c are satisfied (Yes), the job control unit 201 proceeds to processing of step S27 because the x-th bundle is a last bundle (a trailing bundle) for each copy in the forward order. In addition, in the processing of the step S25, when it is determined that both of the condition for the order in which the sheet bundles are discharged and the condition for the value of the remainder c are satisfied (Yes), the job control unit 201 proceeds to processing of step S27 because the x-th bundle is a first bundle (a leading bundle) for each copy in the reverse order. In the processing of the step S27, the job control unit 201 determines the number of sheets to be folded in an overlapping manner in the x-th bundle as b, which is the same as the remainder b (S27), and ends the process of calculating the number of sheets to be folded in an overlapping manner in the x-th bundle.

By executing the process of calculating the number of sheets to be folded in an overlapping manner in the x-th bundle as illustrated in FIG. 7, in a case where a fractional bundle of sheets is generated in a number less than the designated number of sheets, the image forming system 1 can output the fractional bundle of sheets at the end of each copy in the forward order or can output the fractional bundle of sheets at the beginning of each copy in the reverse order.

In other words, in the print job 700 in which the sheets are folded in bundles each including a designated number of sheets (a predetermined number of sheets), in a case where a bundle of sheets is generated in a number less than the predetermined number of sheets, the job control unit 201 folds the bundle of sheets in the number less than the predetermined number of sheets at the end of printing for one copy in the first mode. In addition, in the print job 700 in which the sheets are folded in bundles each including a designated number of sheets (a predetermined number of sheets), in a case where a bundle of sheets is generated in a number less than the predetermined number of sheets, the job control unit 201 folds the bundle of sheets in the number less than the predetermined number of sheets at the beginning of printing for one copy in the second mode.

Sheet Bundles Discharged after being Folded Inwardly in Three

Sheet bundles discharged after being folded inwardly in three in the image forming system 1 according to the first embodiment will be described with reference to FIGS. 8A and 8B. FIG. 8A is a view for explaining sheet bundles arranged in the forward order with the sheets in each bundle being arranged in the forward order, and FIG. 8B is a view for explaining sheet bundles arranged in the reverse order with the sheets in each bundle being arranged in the reverse order. In the examples illustrated in FIGS. 8A and 8B, 2 copies are designated as the copy number information 731, 3 sheets are designated as the overlap-folded sheet number information 734, and 7 pages are designated as the number of pages for each copy in the print job 700. Note that the finisher 240 according to the first embodiment discharges sheets in such a manner that end portions of the sheets constituting sheet bundles abut on the sheet discharge tray 332, while the sheet bundles are stacked in an overlapping manner. In other words, the finisher 240 discharges sheets so that opening portions of sheet bundles folded inwardly in three are directed downward.

As illustrated in FIG. 8A, in the image forming system 1, in a case where bundles are arranged in the forward order with sheets in each bundle being arranged in the forward order (first mode), products are discharged in the following order: a first bundle 610, a second bundle 620, a third bundle 630, a fourth bundle 611, a fifth bundle 621, and a sixth bundle 631.

The first bundle 610 is folded inwardly in three so that a sheet of first page, a sheet of second page, and a sheet of third page are sequentially arranged, with the sheet of first page being an innermost sheet. The second bundle 620 is folded inwardly in three so that a sheet of fourth page, a sheet of fifth page, and a sheet of sixth page are sequentially arranged, with the sheet of fourth page being an innermost sheet. As the third bundle 630, only a sheet of seventh page is folded inwardly in three.

The fourth bundle 611 is folded inwardly in three so that a sheet of first page, a sheet of second page, and a sheet of third page are sequentially arranged, with the sheet of first page being an innermost sheet. The fifth bundle 621 is folded inwardly in three so that a sheet of fourth page, a sheet of fifth page, and a sheet of sixth page are sequentially arranged, with the sheet of fourth page being an innermost sheet. As the sixth bundle 631, only a sheet of seventh page is folded inwardly in three.

As described above, in the case where bundles are arranged in the forward order with sheets in each bundle being arranged in the forward order, page numbers of the sheets included in the second bundle 620 as a second sheet bundle are larger than page numbers of the sheets included in the first bundle 610 as a first sheet bundle. In addition, in the case where bundles are arranged in the forward order with sheets in each bundle being arranged in the forward order, a plurality of sheets constituting each sheet bundle are arranged in a page order in which page numbers of the sheets ascend from an innermost sheet to an outermost sheet. Furthermore, the third bundle 630 as a third sheet bundle including sheets in a number less than the predetermined number of sheets is folded in a bundling manner at the end of printing for one copy. In a case where the print side is an inward side, the image forming system 1 can set the inward side of the first bundle 610 as a first print side of the first copy. In addition, in a case where the print side is an inward side, the image forming system 1 can set the inward side of the fourth bundle 611 as a first print side of the second copy.

As illustrated in FIG. 8B, in the image forming system 1, in a case where bundles are arranged in the reverse order with sheets in each bundle being arranged in the reverse order (second mode), products are discharged in the following order: a first bundle 640, a second bundle 650, a third bundle 660, a fourth bundle 641, a fifth bundle 651, and a sixth bundle 661.

As the first bundle 640, only a sheet of seventh page is folded inwardly in three. The second bundle 650 is folded inwardly in three so that a sheet of sixth page, a sheet of fifth page, and a sheet of fourth page are sequentially arranged, with the sheet of sixth page being an innermost sheet. The third bundle 660 is folded inwardly in three so that a sheet of third page, a sheet of second page, and a sheet of first page are sequentially arranged, with the sheet of third page being an innermost sheet.

As the fourth bundle 641, only a sheet of seventh page is folded inwardly in three. The fifth bundle 651 is folded inwardly in three so that a sheet of sixth page, a sheet of fifth page, and a sheet of fourth page are sequentially arranged, with the sheet of sixth page being an innermost sheet. The sixth bundle 661 is folded inwardly in three so that a sheet of third page, a sheet of second page, and a sheet of first page are sequentially arranged, with the sheet of third page being an innermost sheet.

As described above, in the case where bundles are arranged in the reverse order with sheets in each bundle being arranged in the reverse order, page numbers of the sheets included in the second bundle 650 as a first sheet bundle are larger than page numbers of the sheets included in the third bundle 660 as a second sheet bundle. In addition, in the case where bundles are arranged in the reverse order with sheets in each bundle being arranged in the reverse order, a plurality of sheets constituting each sheet bundle are arranged in a page order in which page numbers of the sheets ascend from an outermost sheet to an innermost sheet. Furthermore, the first bundle 640 as a third sheet bundle including sheets in a number less than the predetermined number of sheets is folded in a bundling manner at the beginning of printing for one copy. In a case where the print side is an outward side, the image forming system 1 can set the central portion Se of the outward side of the third bundle 660 as a first side of the first copy. In addition, in a case where the print side is an outward side, the image forming system 1 can set the central portion Se of the outward side of the sixth bundle 661 as a first side of the second copy.

As described above, in the image forming system 1, the first bundle 610, the second bundle 620, and the third bundle 630 that are arranged in the forward order with the sheets in each bundle being arranged in the forward order can correspond to the third bundle 660, the second bundle 650, and the first bundle 640 that are arranged in the reverse order with the sheets in each bundle being arranged in the reverse order. For example, in the image forming system 1, the first bundle 610 and the third bundle 660 can be constituted by the same pages of sheets, although the sheets are arranged in different orders between the first bundle 610 and the third bundle 660.

Summary of First Embodiment

As described above, the image forming system 1 according to the first embodiment is configured to be able to selectively execute a first mode, in which the printer unit 213 is controlled to discharge sheet bundles in a forward order, and a second mode, in which the printer unit 213 is controlled to discharge sheet bundles in a reverse order. In addition, the image forming system 1 is configured to be able to selectively execute a first folding mode, in which the printer unit 213 is controlled to discharge sheets in each bundle in a forward order, and a second folding mode, in which the printer unit 213 is controlled to discharge sheets in each bundle in a reverse order, as a page order in each sheet bundle. Therefore, the image forming system 1 makes it possible to select an image desired to appear on a front surface after the folding process within a selectable range, such that the user can select the image on the front surface of the sheet bundle without changing image data, thereby preventing deterioration in usability.

In addition, the image forming system 1 according to the first embodiment makes it possible to arrange sheets of sheet bundles folded in an overlapping manner in the same page order regardless of an order in which the sheet bundles are discharged. As a result, the image forming system 1 makes it possible to prevent a page order in which output sheets of sheet bundles are arranged from changing according to the order in which the sheet bundles are discharged, thereby preventing deterioration in usability.

Second Embodiment

Next, an image forming system 1 according to a second embodiment will be described. The image forming system 1 according to the second embodiment is configured to be able to designate a reverse order in each bundle and a forward order between bundles, as well as a forward order in each bundle and a forward order between bundles or a reverse order in each bundle and a reverse order between bundles, by the page order information 735 included in the print job 700. In this respect, the image forming system 1 according to the second embodiment is different from that according to the first embodiment described above. Since the other configurations are similar to those in the first embodiment, description thereof will be omitted, while components common to those in the first embodiment are denoted by the same reference numerals, control processes common to those in the first embodiment are denoted by the same step numbers.

Print Control Process in Case where Inward Tri-Folding is Performed

Figure 9:
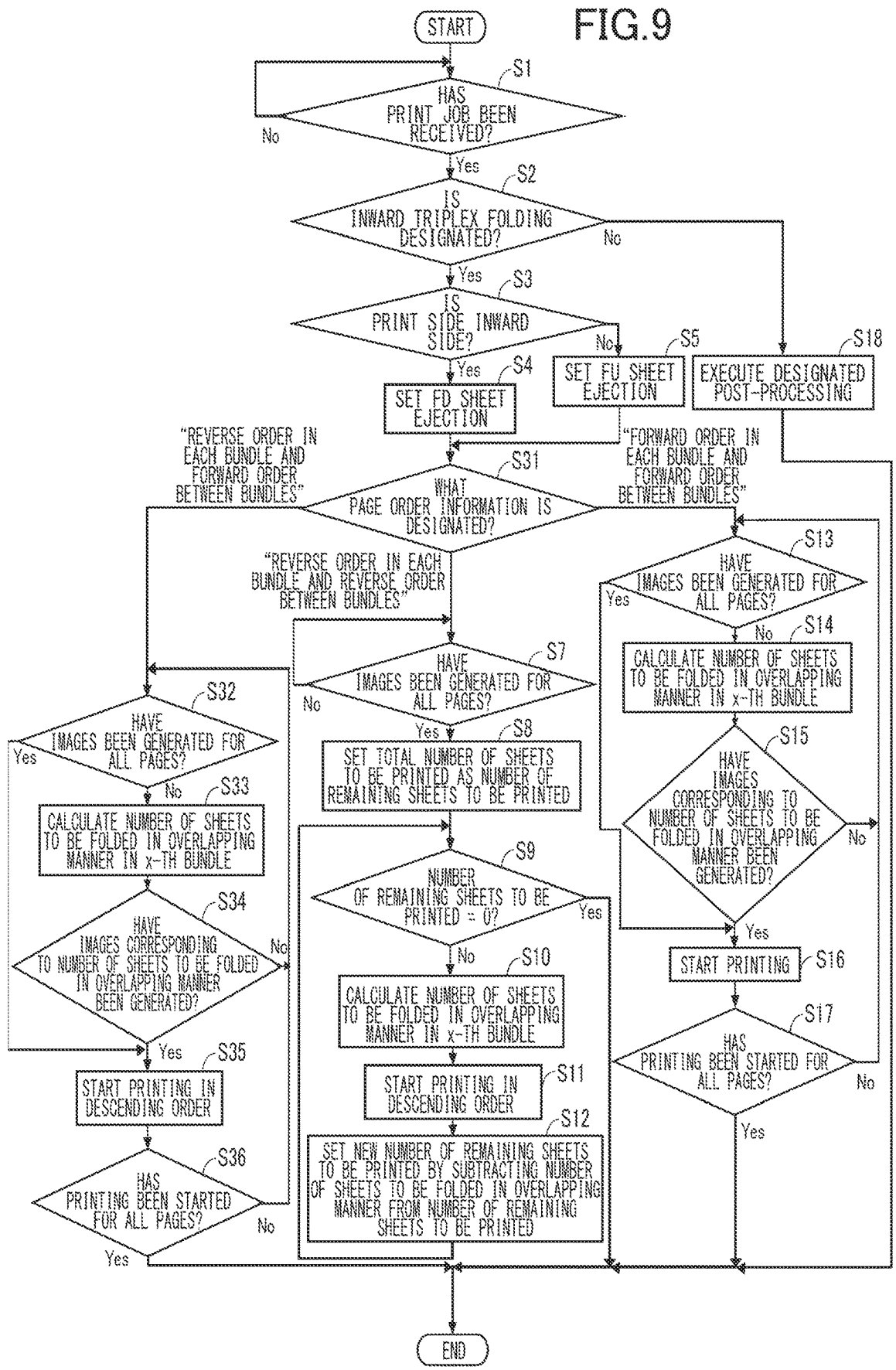
FIG. 9 is a flowchart illustrating a print control process in a case where a job control unit causes a finisher to execute inward tri-folding according to a second embodiment.

FIG. 9 is a flowchart illustrating a print control process in a case where the job control unit 201 of the controller 210 of the image forming apparatus 200 according to the second embodiment causes the finisher 240 to execute inward tri-folding.

After the processing of the step S4 or S5 is executed, the job control unit 201 determines a page order in each sheet bundle and an order in which sheet bundles discharged that are designated in the page order information 735 included in the print job 700 (S31). In this processing, the job analysis unit 202 analyzes the page order information 735 of the print job 700, and notifies the job control unit 201 of an analysis result. When the job control unit 201 determines that a reverse order between bundles with a reverse order in each bundle (a reverse order between bundles & a reverse order in each bundle) is designated from the notification, the process proceeds to step S7. When the job control unit 201 determines that a forward order between bundles with a forward order in each bundle (a forward order between bundles & a forward order in each bundle) is designated from the notification, the process proceeds to step S13.

When the job control unit 201 determines that a forward order between bundles with a reverse order in each bundle (a forward order between bundles & a reverse order in each bundle) is designated from the notification, the process proceeds to step S32.

In the processing of the step S32, the job control unit 201 determines whether or not image data has been generated for all the pages designated in the print job 700 (S32). In this processing, when it is determined that images have not been generated for all the pages (No), the job control unit 201 calculates the number of sheets to be folded in an overlapping manner in an x-th bundle (S33).

In the processing of the step S33, the job control unit 201 executes the process of calculating the number of sheets to be folded in an overlapping manner illustrated in FIG. 7. In a case where a forward order between bundles with a reverse order in each bundle is set, when the number of sheets for each copy exceeds the designated number of sheets, and a bundle of sheets are further generated in a number less than the designated number of sheets, the job control unit 201 executes the processing of the steps S21 to S27 of FIG. 7 and calculates the number of sheets to be folded in an overlapping manner so that the fractional bundle is a last bundle.

Next, the job control unit 201 determines whether or not image data corresponding to the number of sheets to be folded in an overlapping manner calculated in the processing of the step S33 has been generated (S34). In this processing, when it is determined that image data corresponding to the number of sheets to be folded in an overlapping manner has not been generated (No), the job control unit 201 returns to the processing of the step S32.

On the other hand, when it is determined that image data corresponding to the number of sheets to be folded in an overlapping manner has been generated (Yes), or when it is determined in the processing of the step S32 that images have been generated for all the pages (Yes), the job control unit 201 proceeds to processing of step S35. In the processing of the step S35, the job control unit 201 starts printing the images in the page order designated in the print job 700 in descending order (S35). In this processing, the job control unit 201 starts printing in descending order by sequentially transferring image data corresponding to the number of sheets to be folded in an overlapping manner calculated in the processing of the step S33 to the printer unit 213 from image data for a last page of the generated image data. Furthermore, in the processing of the step S35, the job control unit 201 also transfers settings for inward tri-folding and settings for sheet discharge set in the processing of the step S4 or S5 to the printer unit 213.

Next, the job control unit 201 determines whether or not the image data for all the pages designated in the print job 700 has been transferred to the printer unit 213, and the printing of the images has been started for all the pages (S36). In this processing, when it is determined that the image data for all the pages designated in the print job 700 has been transferred to the printer unit 213 (Yes), the job control unit 201 determines that the received print job 700 has been completed. Then, the job control unit 201 ends the print control process for executing the inward tri-folding. On the other hand, when it is determined that some of the image data for all the pages designated in the print job 700 has not been transferred to the printer unit 213 (No), the job control unit 201 determines that the received print job 700 has not been completed, and returns to the processing to the step S32. The processing of steps S32 to S36, in which the plurality of sheet bundles are output by the image forming system 1 in a forward order with sheets in each bundle being output in a reverse order as described above, constitutes a third mode in the second embodiment.

Figure 10:
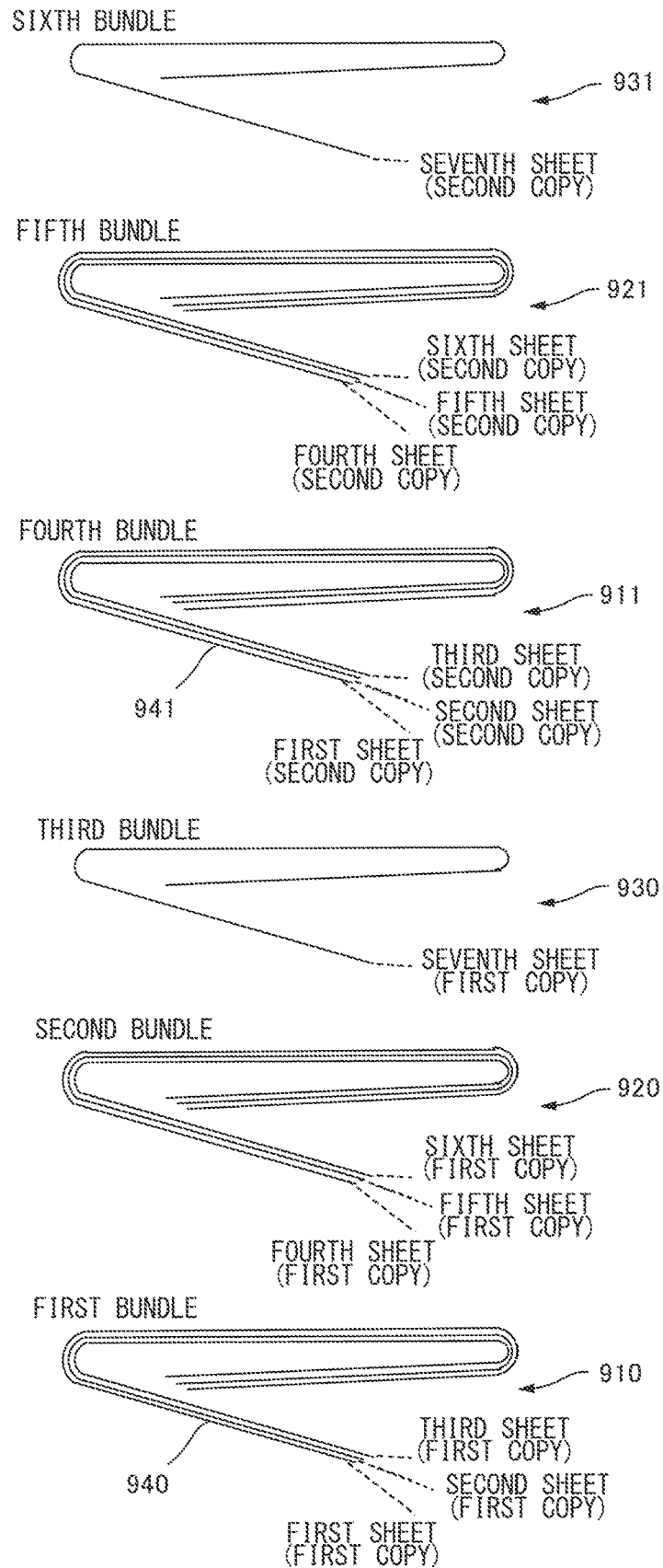
FIG. 10 is a diagram illustrating sheet bundles discharged in a forward order with sheets in each bundle being arranged in a reverse order in an image forming system according to the second embodiment.

Sheet Bundles Discharged in Forward Order with Sheets in Each Bundle being Discharged in Reverse Order after being Folded Inwardly in Three Sheet bundles discharged in a forward direction with sheets in each bundle being discharged in a reverse direction after being folded inwardly in three in the image forming system 1 according to the second embodiment will be described with reference to FIG. 10. FIG. 10 is a diagram for explaining sheet bundles arranged in a forward direction with sheets in each bundle being arranged in a reverse direction. In the example illustrated in FIG. 10, 2 copies are designated as the copy number information 731, 3 sheets are designated as the overlap-folded sheet number information 734, and 7 pages are designated as the number of pages for each copy in the print job 700. Note that the finisher 240 according to the second embodiment discharges sheets in such a manner that end portions of the sheets constituting sheet bundles abut on the sheet discharge tray 332, while the sheet bundles are stacked in an overlapping manner. In other words, the finisher 240 discharges sheets so that opening portions of sheet bundles folded inwardly in three are directed downward.

As illustrated in FIG. 10, in the image forming system 1, in a case where bundles are arranged in the forward order with sheets in each bundle being arranged in the reverse order (third mode), products are discharged in the following order: a first bundle 910, a second bundle 920, a third bundle 930, a fourth bundle 911, a fifth bundle 921, and a sixth bundle 931.

The first bundle 910 is folded inwardly in three so that a sheet of third page, a sheet of second page, and a sheet of first page are sequentially arranged, with the sheet of third page being an innermost sheet. The second bundle 920 is folded inwardly in three so that a sheet of sixth page, a sheet of fifth page, and a sheet of fourth page are sequentially arranged, with the sheet of sixth page being an innermost sheet. As the third bundle 930, only a sheet of seventh page is folded inwardly in three.

The fourth bundle 911 is folded inwardly in three so that a sheet of third page, a sheet of second page, and a sheet of first page are sequentially arranged, with the sheet of third page being an innermost sheet. The fifth bundle 921 is folded inwardly in three so that a sheet of sixth page, a sheet of fifth page, and a sheet of fourth page are sequentially arranged, with the sheet of sixth page being an innermost sheet. As the sixth bundle 631, only a sheet of seventh page is folded inwardly in three.

As described above, in the case where bundles are arranged in the forward order with sheets in each bundle being arranged in the reverse order, page numbers of the sheets included in the second bundle 920 as a second sheet bundle are larger than page numbers of the sheets included in the first bundle 910 as a first sheet bundle. In addition, in the case where bundles are arranged in the forward order with sheets in each bundle being arranged in the reverse order, a plurality of sheets constituting each sheet bundle are arranged in a page order in which page numbers of the sheets ascend from an outermost sheet to an innermost sheet. Furthermore, the third bundle 930 as a third sheet bundle including sheets in a number less than the predetermined number of sheets is folded in a bundling manner as a last bundle of printing for one copy. In a case where the print side is an outward side, the image forming system 1 can set an outward end portion 940 of the first bundle 910 as a first side of the first copy. In addition, in a case where the print side is an outward side, the image forming system 1 can set an outward end portion 941 of the fourth bundle 911 as a first side of the second copy.

As described above, in the image forming system 1, the first bundle 910, the second bundle 920, and the third bundle 930 arranged in the forward order with the sheets in each bundle being arranged in the reverse order can correspond to the third bundle 660, the second bundle 650, and the first bundle 640 arranged in the reverse order with the sheets in each bundle being arranged in the reverse order as illustrated in FIG. 8B, respectively. For example, in the image forming system 1, the third bundle 660 among bundles arranged in the reverse order with the sheets in each bundle being arranged in the reverse order and the first bundle 910 among bundles arranged in the forward order with the sheets in each bundle being arranged in the reverse order can be constituted by the same pages of sheets, although the third bundle 660 and the first bundle 910 are arranged in different orders.

Summary of Second Embodiment

As described above, the image forming system 1 according to the second embodiment is configured to be able to select any one of a forward order in each bundle and a reverse order in each bundle as a page order in each sheet bundle, even when the order in which the sheet bundles are discharged in the forward order. Therefore, the image forming system 1 makes it possible to expand a range in which an image desired to appear on a front surface after the folding process can be selected without changing the order in which the sheet bundles are discharged, such that the user can select the image on the front surface of the sheet bundle without changing image data. As a result, the image forming system 1 can prevent deterioration in usability.

In addition, the image forming system 1 according to the second embodiment makes it possible to arrange sheets of sheet bundles folded in an overlapping manner in the same page order regardless of an order in which the sheet bundles are discharged. As a result, the image forming system 1 makes it possible to prevent a page order in which output sheets of sheet bundles are arranged from changing according to the order in which the sheet bundles are discharged, thereby preventing deterioration in usability.

Other Embodiments

In the second embodiment, the image forming system 1 is configured to be able to designate, as a page order in each sheet bundle and an order in which sheet bundles are discharged, a forward order in each bundle and a forward order between bundles, a reverse order in each bundle and a reverse order between bundles, or a reverse order in each bundle and a forward order between bundles, but is not limited thereto. The image forming system 1 may be configured to be able to designate a forward order in each bundle and a reverse order between bundles, as well as a forward order in each bundle and a forward order between bundles, a reverse order in each bundle and a reverse order between bundles, or a reverse order in each bundle and a forward order between bundles.

In a case where the sheet bundles subjected to inward tri-folding are discharged in the reverse order with the sheets in each bundle being arranged in the forward order, when the number of sheets for each copy exceeds the designated number of sheets, and a bundle of sheets are further generated in a number less than the designated number of sheets, the job control unit 201 calculates the number of sheets to be folded in an overlapping manner so that the fractional bundle is a first bundle.

As a result, the image forming system 1 makes it possible to arrange sheets of sheet bundles folded in an overlapping manner in the same page order regardless of an order in which the sheet bundles are discharged. In addition, the image forming system 1 makes it possible to prevent a page order in which output sheets of sheet bundles are arranged from changing according to the order in which the sheet bundles are discharged, thereby preventing deterioration in usability.

In addition, in the first and second embodiments, the finisher 240 is configured to discharge sheets subjected to inward tri-folding in such a manner that end portions of the sheets constituting sheet bundles abut on the sheet discharge tray 332, but is not limited thereto. The finisher 240 may be configured to discharge sheets subjected to inward tri-folding in such a manner that central portions sandwiched between fold lines of one end portions and fold lines of the other end portions of the sheet bundles abut on the sheet discharge tray 332, that is, to discharge sheets in such a manner that opening portions of the sheet bundle are directed upward.

In a case where the finisher 240 is configured as described above, the job control unit 201 may be configured to perform FU sheet discharge when an inward side is designated as the print side, and perform FD sheet discharge when an outward side is designated as the print side.

In addition, in the first and second embodiments, the job control unit 201 is configured to execute the control process illustrated in FIG. 6 or 9 to determine an order in which sheets in a number less than the designated number of sheets in a fractional bundle are discharged for inward tri-folding, but is not limited thereto. For example, even in a case where duplex folding is executed as post-processing, the job control unit 201 may be configured to discharge a fractional bundle as a last bundle when the sheet bundles are discharged in the forward order, and discharge a fractional bundle as a first bundle when the sheet bundles are discharged in the reverse order.

In addition, for example, even in a case where duplex folding is executed as post-processing, the job control unit 201 may be configured to be able to designate a page order in each sheet bundle and an order in which sheet bundles are discharged. That is, even in a case where duplex folding is executed, the job control unit 201 may be configured to be able to select a forward order in each bundle and a forward order between bundles, a reverse order in each bundle and a reverse order between bundles, a reverse order in each bundle and a forward order between bundles, or a forward order in each bundle and a reverse order between bundles.

In addition, in the first and second embodiments, the job control unit 201 is configured to set which of FD sheet discharge and FU sheet discharge is to be executed depending on a print side designated by the folded print side information 733 included in the print job 700, but is not limited thereto. For example, the job control unit 201 may be configured to set which of FD sheet discharge and FU sheet discharge is to be executed depending on a page order in each sheet bundle. Specifically, the job control unit 201 may be configured to execute FD sheet discharge when a forward order in each bundle is designated by the page order information 735 included in the print job 700, and execute FU sheet discharge when a reverse order in each bundle is designated by the page order information 735 included in the print job 700.

In addition, in the first and second embodiments, the image forming system 1 is configured to reverse a print side of the sheet S when the sheet S is fed to the finisher 240 using the conveyance path in a case where double-sided printing is performed on the sheet S, but is not limited thereto. For example, the image forming system 1 may be configured to reverse a print side of the sheet S by directly conveying the sheet S from the conveyance path P1 to the sheet discharge port 323, rather than changing the conveyance path through the flapper 325, switching back the sheet S at the sheet discharge port 322, and conveying the switched-back sheet S to the sheet discharge port 323. Alternatively, the image forming system 1 may be configured to reverse a print side of the sheet S by switching back the sheet S after conveying the sheet S to the vicinity of the sheet discharge port 331, and conveying the switched-back sheet S to the conveyance path P6 by changing the conveyance path through the flapper 329.

That is, the image forming system 1 may be configured to reverse a print side of the sheet S using a configuration enabling the sheet to be switched back or a configuration enabling double-sided printing provided in the printer unit 213 or the finisher 240.

In addition, in the first and second embodiments, the job control unit 201 is configured to generate sheet bundles in the page order in each sheet bundle and in the order in which the sheet bundles are discharged that are designated by the page order information 735 of the print job 700, but is not limited thereto. For example, in a case where one sheet is designated as the number of sheets designated by the overlap-folded sheet number information 734 of the print job 700, the job control unit 201 may be configured to select a forward order in discharging the bundles regardless of information designated by the page order information 735.

In addition, in the first and second embodiments, the image forming system 1 is a multi-function printer (MFP) including the image forming apparatus 200 and the finisher 240, but is not limited thereto. For example, the image forming system 1 may be a single function printer (SFP) in which the image forming apparatus has a finishing function. In such a configuration, the image forming apparatus constitutes the image forming system.

According to the present disclosure, it is possible to selectively change an order in which sheet bundles are discharged without changing image data, thereby preventing deterioration in usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-193527, filed Nov. 29, 2021, which is hereby incorporated by reference herein in its entirety.

What is claimed is:

1. An image forming system comprising:
an image forming unit configured to form images on a plurality of sheets;
a sheet folding unit configured to fold the plurality of sheets, on which the images are formed by the image forming unit, to form a plurality of sheet bundle;
a sheet discharge tray to which the sheets folded by the sheet folding unit are discharged; and
a control unit configured to receive a print job and control the image forming unit based on the print job, the print job including information on the number of pages of the sheets on which the images are formed and information on the number of sheets folded by the sheet folding unit in the sheet bundle,
wherein, for the print job in which the plurality of sheet bundles including a first sheet bundle and a second sheet bundle discharged after the first sheet bundle are discharged onto the sheet discharge tray, the control unit is configured to selectively execute a first image forming mode and a second image forming mode,
the first image forming mode being a mode in which a page order in which the images are formed on the sheets by the image forming unit is controlled in such a manner that page numbers of sheets included in the second sheet bundle are larger than page numbers of sheets included in the first sheet bundle,
the second image forming mode being a mode in which a page order in which the images are formed on the sheets by the image forming unit is controlled in such a manner that page numbers of sheets included in the first sheet bundle are larger than page numbers of sheets included in the second sheet bundle.

2. The image forming system according to claim 1, wherein the control unit is configured to selectively execute a first folding mode and a second folding mode,
the first folding mode being a mode in which the sheet folding unit folds the plurality of sheets constituting each of the sheet bundles in an order in which the page numbers of the sheets ascend from an innermost sheet to an outermost sheet, and
the second folding mode being a mode in which the sheet folding unit folds the plurality of sheets constituting each of the sheet bundles in an order in which the page numbers of the sheets ascend from an outermost sheet to an innermost sheet.

3. The image forming system according to claim 1, wherein the print job includes information on the number of copies of sheets to be printed, and
in the print job in which a predetermined number of sheets are folded by the sheet folding unit to form each of the sheet bundles, the sheet folding unit is configured to fold a third sheet bundle including sheets in a number less than the predetermined number of sheets at the end of printing for each copy in the first image forming mode, and fold the third sheet bundle at the beginning of printing for each copy in the second image forming mode.

4. The image forming system according to claim 1, wherein the image forming unit is configured to form an image on a first side of each of the sheets in a case where the print job is single-sided printing, and
the sheet folding unit is configured to execute a tri-folding process for folding one end portion and the other end portion of the sheet in such a manner that the first side is an inward side.

5. The image forming system according to claim 1, wherein the image forming unit is configured to form an image on a first side of each of the sheets in a case where the print job is single-sided printing, and
the sheet folding unit is configured to execute a tri-folding process for folding one end portion and the other end portion of the sheet in such a manner that a second side, which is a back side of the first side, is an inward side.

6. The image forming system according to claim 1, wherein the image forming unit is configured to form an image on a first side of each of the sheets in a case where the print job is single-sided printing, and
the sheet folding unit is configured to execute a first tri-folding process for folding one end portion and the other end portion of the sheet in such a manner that the first side is an inward side, and a second tri-folding process for folding one end portion and the other end portion of the sheet in such a manner that a second side, which is a back side of the first side, is an inward side.

7. The image forming system according to claim 1, wherein the control unit is configured to select and execute the first image forming mode in a case where the number of sheets folded by the sheet folding unit is one.

8. An image forming system comprising:
an image forming unit configured to form images on a plurality of sheets;
a sheet folding unit configured to fold the plurality of sheets, on which the images are formed by the image forming unit, to form a plurality of sheet bundles;
a sheet discharge tray to which the sheets folded by the sheet folding unit are discharged; and
a control unit configured to receive a print job and control the image forming unit based on the print job, the print job including information on the number of pages of the sheets on which the images are formed and information on the number of sheets folded by the sheet folding unit in each of the sheet bundles,
wherein, for the print job in which the plurality of sheet bundles including a first sheet bundle and a second sheet bundle discharged after the first sheet bundle are discharged onto the sheet discharge tray, the control unit is configured to selectively execute a first mode and a second mode,
the first mode being a mode in which a page order in which the images are formed on the sheets by the image forming unit is controlled in such a manner that page numbers of sheets included in the second sheet bundle are larger than page numbers of sheets included in the first sheet bundle, and the plurality of sheets constituting each of the sheet bundles are arranged in an order in which page numbers of the sheets ascend from an innermost sheet to an outermost sheet, the second mode being a mode in which a page order in which the images are formed on the sheets by the image forming unit is controlled in such a manner that page numbers of sheets included in the first sheet bundle are larger than page numbers of sheets included in the second sheet bundle, and the plurality of sheets constituting each of the sheet bundles are arranged in an order in which page numbers of the sheets ascend from an outermost sheet to an innermost sheet.

9. The image forming system according to claim 8, wherein the print job includes information on the number of copies of sheets to be printed, and in the print job in which a predetermined number of sheets are folded by the sheet folding unit to form each of the sheet bundles, the sheet folding unit is configured to fold a third sheet bundle including sheets in a number less than the predetermined number of sheets at the end of printing for each copy in the first mode, and fold the third sheet bundle at the beginning of printing for each copy in the second mode.

10. The image forming system according to claim 8, wherein the image forming unit is configured to form an image on a first side of each of the sheets in a case where the print job is single-sided printing, and the sheet folding unit is configured to execute a first tri-folding process for folding one end portion and the other end portion of the sheet in such a manner that the first side is an inward side, and a second tri-folding process for folding one end portion and the other end portion of the sheet in such a manner that a second side, which is a back side of the first side, is an inward side.

11. The image forming system according to claim 8, wherein, for the print job in which the plurality of sheet bundles including the first sheet bundle and the second sheet bundle are discharged onto the sheet discharge tray, the control unit is configured to execute a third mode in which a page order in which the images are formed on the sheets by the image forming unit is controlled in such a manner that page numbers of sheets included in the second sheet bundle are larger than page numbers of sheets included in the first sheet bundle, and the plurality of sheets constituting each of the sheet bundles are arranged in an order in which page numbers of the sheets ascend from an outermost sheet to an innermost sheet.

12. The image forming system according to claim 8, wherein the control unit is configured to select and execute the first image forming mode in a case where the number of sheets folded by the sheet folding unit is one.

\* \* \* \* \*